US011061761B2

(12) United States Patent
Iyer et al.

(10) Patent No.: US 11,061,761 B2
(45) Date of Patent: Jul. 13, 2021

(54) MULTICHIP PACKAGE LINK ERROR DETECTION

(71) Applicant: Intel Corporation, Santa Clara, CA (US)

(72) Inventors: Venkatraman Iyer, Austin, TX (US); Robert G. Blankenship, Tacoma, WA (US); Mahesh Wagh, Portland, OR (US); Zuoguo Wu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/779,391

(22) Filed: Jan. 31, 2020

(65) Prior Publication Data

US 2020/0319957 A1 Oct. 8, 2020

Related U.S. Application Data

(63) Continuation of application No. 15/741,967, filed as application No. PCT/US2015/052509 on Sep. 26, 2015, now Pat. No. 10,552,253.

(51) Int. Cl.
*G06F 11/10* (2006.01)
*H03M 13/00* (2006.01)
(Continued)

(52) U.S. Cl.
CPC .......... *G06F 11/1004* (2013.01); *G06F 13/16* (2013.01); *H04L 1/00* (2013.01);
(Continued)

(58) Field of Classification Search
CPC ...... G06F 11/1004; G06F 13/16; H04L 29/06; H04L 1/00; H04L 1/20; H04L 1/0045;
(Continued)

(56) References Cited

U.S. PATENT DOCUMENTS

2005/0229089 A1 10/2005 Oza et al.
2009/0248947 A1 10/2009 Malwankar et al.
(Continued)

FOREIGN PATENT DOCUMENTS

CN 101459509 A 6/2009
CN 102439888 A 5/2012
(Continued)

OTHER PUBLICATIONS

PCT International Preliminary Report on Patentability for PCT Patent Application No. PCT/US2015/052509; dated Apr. 5, 2018; 12 pages.

(Continued)

*Primary Examiner* — Samir W Rizk
(74) *Attorney, Agent, or Firm* — Alliance IP, LLC

(57) ABSTRACT

First data is received on a plurality of data lanes of a physical link and a stream signal corresponding to the first data is received on a stream lane identifying a type of the first data. A first instance of an error detection code of a particular type is identified in the first data. Second data is received on at least a portion of the plurality of data lanes and a stream signal corresponding to the second data is received on the stream lane identifying a type of the second data. A second instance of the error detection code of the particular type is identified in the second data. The stream lane is another one of the lanes of the physical link and, in some instance, the type of the second data is different from the type of the first data.

26 Claims, 25 Drawing Sheets

(51) Int. Cl.

*H04L 29/06* (2006.01)
*H04L 1/00* (2006.01)
*H04L 1/20* (2006.01)
*G06F 13/16* (2006.01)
*H04L 1/16* (2006.01)

(52) U.S. Cl.

CPC .......... *H04L 1/0041* (2013.01); *H04L 1/0045* (2013.01); *H04L 1/0061* (2013.01); *H04L 1/0075* (2013.01); *H04L 1/20* (2013.01); *H04L 29/06* (2013.01); *G06F 2213/16* (2013.01); *H04L 1/1607* (2013.01); *H04L 2001/0094* (2013.01); *Y02D 10/00* (2018.01)

(58) Field of Classification Search

CPC ... H04L 1/0061; H04L 1/0075; H04L 1/0041; H04L 1/1607

See application file for complete search history.

(56) References Cited

U.S. PATENT DOCUMENTS

2010/0107243 A1 4/2010 Moyer et al.
2010/0115174 A1 5/2010 Akyol et al.
2010/0150285 A1 6/2010 Tazebay et al.
2010/0165910 A1 7/2010 Mathews et al.
2015/0180507 A1* 6/2015 Willey .................. H03M 13/09 714/758

FOREIGN PATENT DOCUMENTS

CN 103260191 A 8/2013
CN 104272624 A 1/2015
CN 104756434 A 7/2015
CN 104798047 A 7/2015
WO 2015099719 A1 7/2015
WO 2017052661 A1 3/2017

OTHER PUBLICATIONS

PCT International Search Report and Written Opinion for PCT Patent Application No. PCT/US2015/052509; dated Jul. 14, 2016; 14 pages.

China Patent Office (SIPO) First Office Action issued in Chinese Patent Application No. CN 201580082723.3, dated Jun. 30, 2020; 12 pages with English translation.

SIPO; Notice of Allowance issued in CN Patent Application No. 201580082723.3, dated Feb. 4, 2021; 7 pages including English translation.

* cited by examiner

| | | LANES | | | | | | | | | | | | | | |
|---|---|---|---|---|---|---|---|---|---|---|---|---|---|---|---|---|
| | | **48** | **47** | **46** | **45** | **44** | **43** | **42** | **41** | **40** | **39** | **38** | **37** | **36** | **35** | **34** |
| UI | **1** | 384 | 376 | 368 | 360 | 352 | 344 | 336 | 328 | 320 | 312 | 304 | 296 | 288 | 280 | 272 |
| | **2** | 385 | 377 | 369 | 361 | 353 | 345 | 337 | 329 | 321 | 313 | 305 | 297 | 289 | 281 | 273 |
| | **3** | 386 | 378 | 370 | 362 | 354 | 346 | 338 | 330 | 322 | 314 | 306 | 298 | 290 | 282 | 274 |
| | **4** | 387 | 379 | 371 | 363 | 355 | 347 | 339 | 331 | 323 | 315 | 307 | 299 | 291 | 283 | 275 |
| | **5** | 388 | 380 | 372 | 364 | 356 | 348 | 340 | 332 | 324 | 316 | 308 | 300 | 292 | 284 | 276 |
| | **6** | 389 | 381 | 373 | 365 | 357 | 349 | 341 | 333 | 325 | 317 | 309 | 301 | 293 | 285 | 277 |
| | **7** | 390 | 382 | 374 | 366 | 358 | 350 | 342 | 334 | 326 | 318 | 310 | 302 | 294 | 286 | 278 |
| | **8** | 391 | 383 | 375 | 367 | 359 | 351 | 343 | 335 | 327 | 319 | 311 | 303 | 295 | 287 | 279 |
| | | HEADER SLOT TYPE | | | | | | | | | | | | | | |

| | | LANES | | | | | | | | | | | | | | | |
|---|---|---|---|---|---|---|---|---|---|---|---|---|---|---|---|---|---|
| | | **33** | **32** | **31** | **30** | **29** | **28** | **27** | **26** | **25** | **24** | **23** | **22** | **21** | **20** | **19** | **18** |
| UI | **1** | 264 | 256 | 248 | 240 | 232 | 224 | 216 | 208 | 200 | 192 | 184 | 176 | 168 | 160 | 152 | 144 |
| | **2** | 265 | 257 | 249 | 241 | 233 | 225 | 217 | 209 | 201 | 193 | 185 | 177 | 169 | 161 | 153 | 145 |
| | **3** | 266 | 258 | 250 | 242 | 234 | 226 | 218 | 210 | 202 | 194 | 186 | 178 | 170 | 162 | 154 | 146 |
| | **4** | 267 | 259 | 251 | 243 | 235 | 227 | 219 | 211 | 203 | 195 | 187 | 179 | 171 | 163 | 155 | 147 |
| | **5** | 268 | 260 | 252 | 244 | 236 | 228 | 220 | 212 | 204 | 196 | 188 | 180 | 172 | 164 | 156 | 148 |
| | **6** | 269 | 261 | 253 | 245 | 237 | 229 | 221 | 213 | 205 | 197 | 189 | 181 | 173 | 165 | 157 | 149 |
| | **7** | 270 | 262 | 254 | 246 | 238 | 230 | 222 | 214 | 206 | 198 | 190 | 182 | 174 | 166 | 158 | 150 |
| | **8** | 271 | 263 | 255 | 247 | 239 | 231 | 223 | 215 | 207 | 199 | 191 | 183 | 175 | 167 | 159 | 151 |
| | | GENERIC SLOT TYPE | | | | | | | | | | | | | | | |

| | | LANES | | | | | | | | | | | | | | | | | |
|---|---|---|---|---|---|---|---|---|---|---|---|---|---|---|---|---|---|---|---|
| | | **17** | **16** | **15** | **14** | **13** | **12** | **11** | **10** | **9** | **8** | **7** | **6** | **5** | **4** | **3** | **2** | **1** | **0** |
| UI | **1** | 136 | 128 | 120 | 112 | 104 | 96 | 88 | 80 | 72 | 64 | 56 | 48 | 40 | 32 | 24 | 16 | 8 | 0 |
| | **2** | 137 | 129 | 121 | 113 | 105 | 97 | 89 | 81 | 73 | 65 | 57 | 49 | 41 | 33 | 25 | 17 | 9 | 1 |
| | **3** | 138 | 130 | 122 | 114 | 106 | 98 | 90 | 82 | 74 | 66 | 58 | 50 | 42 | 34 | 26 | 18 | 10 | 2 |
| | **4** | 139 | 131 | 123 | 115 | 107 | 99 | 91 | 83 | 75 | 67 | 59 | 51 | 43 | 35 | 27 | 19 | 11 | 3 |
| | **5** | 140 | 132 | 124 | 116 | 108 | 100 | 92 | 84 | 76 | 68 | 60 | 52 | 44 | 36 | 28 | 20 | 12 | 4 |
| | **6** | 141 | 133 | 125 | 117 | 109 | 101 | 93 | 85 | 77 | 69 | 61 | 53 | 45 | 37 | 29 | 21 | 13 | 5 |
| | **7** | 142 | 134 | 126 | 118 | 110 | 102 | 94 | 86 | 78 | 70 | 62 | 54 | 46 | 38 | 30 | 22 | 14 | 6 |
| | **8** | 143 | 135 | 127 | 119 | 111 | 103 | 95 | 87 | 79 | 71 | 63 | 55 | 47 | 39 | 31 | 23 | 15 | 7 |
| | | GENERIC SLOT TYPE | | | | | | | | | | | | | | | | CRC | |

*FIG. 13A*

| | LANES | | | | | | | | | | | | | | | | | | | | | | | | |
|---|---|---|---|---|---|---|---|---|---|---|---|---|---|---|---|---|---|---|---|---|---|---|---|---|---|
| UI | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 |
| 1 | 384 | 376 | 368 | 360 | 352 | 344 | 336 | 328 | 320 | 312 | 304 | 296 | 288 | 280 | 272 | 264 | 256 | 248 | 240 | 232 | 224 | 216 | 208 | 200 | 192 |
| 2 | 385 | 377 | 369 | 361 | 353 | 345 | 337 | 329 | 321 | 313 | 305 | 297 | 289 | 281 | 273 | 265 | 257 | 249 | 241 | 233 | 225 | 217 | 209 | 201 | 193 |
| 3 | 386 | 378 | 370 | 362 | 354 | 346 | 338 | 330 | 322 | 314 | 306 | 298 | 290 | 282 | 274 | 266 | 258 | 250 | 242 | 234 | 226 | 218 | 210 | 202 | 194 |
| 4 | 387 | 379 | 371 | 363 | 355 | 347 | 339 | 331 | 323 | 315 | 307 | 299 | 291 | 283 | 275 | 267 | 259 | 251 | 243 | 235 | 227 | 219 | 211 | 203 | 195 |
| 5 | 388 | 380 | 372 | 364 | 356 | 348 | 340 | 332 | 324 | 316 | 308 | 300 | 292 | 284 | 276 | 268 | 260 | 252 | 244 | 236 | 228 | 220 | 212 | 204 | 196 |
| 6 | 389 | 381 | 373 | 365 | 357 | 349 | 341 | 333 | 325 | 317 | 309 | 301 | 293 | 285 | 277 | 269 | 261 | 253 | 245 | 237 | 229 | 221 | 213 | 205 | 197 |
| 7 | 390 | 382 | 374 | 366 | 358 | 350 | 342 | 334 | 326 | 318 | 310 | 302 | 294 | 286 | 278 | 270 | 262 | 254 | 246 | 238 | 230 | 222 | 214 | 206 | 198 |
| 8 | 391 | 383 | 375 | 367 | 359 | 351 | 343 | 335 | 327 | 319 | 311 | 303 | 295 | 287 | 279 | 271 | 263 | 255 | 247 | 239 | 231 | 223 | 215 | 207 | 199 |
| | CRC | | PCIe PACKET (TLP, DLLP) | | | | | | | | | | | | | | | | | | | | | | |

| | LANES | | | | | | | | | | | | | | | | | | | | | | | |
|---|---|---|---|---|---|---|---|---|---|---|---|---|---|---|---|---|---|---|---|---|---|---|---|---|
| UI | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1 | 184 | 176 | 168 | 160 | 152 | 144 | 136 | 128 | 120 | 112 | 104 | 96 | 88 | 80 | 72 | 64 | 56 | 48 | 40 | 32 | 24 | 16 | 8 | 0 |
| 2 | 185 | 177 | 169 | 161 | 153 | 145 | 137 | 129 | 121 | 113 | 105 | 97 | 89 | 81 | 73 | 65 | 57 | 49 | 41 | 33 | 25 | 17 | 9 | 1 |
| 3 | 186 | 178 | 170 | 162 | 154 | 146 | 138 | 130 | 122 | 114 | 106 | 98 | 90 | 82 | 74 | 66 | 58 | 50 | 42 | 34 | 26 | 18 | 10 | 2 |
| 4 | 187 | 179 | 171 | 163 | 155 | 147 | 139 | 131 | 123 | 115 | 107 | 99 | 91 | 83 | 75 | 67 | 59 | 51 | 43 | 35 | 27 | 19 | 11 | 3 |
| 5 | 188 | 180 | 172 | 164 | 156 | 148 | 140 | 132 | 124 | 116 | 108 | 100 | 92 | 84 | 76 | 68 | 60 | 52 | 44 | 36 | 28 | 20 | 12 | 4 |
| 6 | 189 | 181 | 173 | 165 | 157 | 149 | 141 | 133 | 125 | 117 | 109 | 101 | 93 | 85 | 77 | 69 | 61 | 53 | 45 | 37 | 29 | 21 | 13 | 5 |
| 7 | 190 | 182 | 174 | 166 | 158 | 150 | 142 | 134 | 126 | 118 | 110 | 102 | 94 | 86 | 78 | 70 | 62 | 54 | 46 | 38 | 30 | 22 | 14 | 6 |
| 8 | 191 | 183 | 175 | 167 | 159 | 151 | 143 | 135 | 127 | 119 | 111 | 103 | 95 | 87 | 79 | 71 | 63 | 55 | 47 | 39 | 31 | 23 | 15 | 7 |
| | PCIe PACKET (TLP, DLLP) | | | | | | | | | | | | | | | | | | | | | | | |

FIG. 13B

| | | LANES | | | | | | | | | | | | | | | | | | | | | | | | |
|---|---|---|---|---|---|---|---|---|---|---|---|---|---|---|---|---|---|---|---|---|---|---|---|---|---|---|
| | | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 |
| UI | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | UNUSED | | | | | | | | | | | | | | | | | | | | | | | | |

| | | LANES | | | | | | | | | | | | | | | | | | | | | | | |
|---|---|---|---|---|---|---|---|---|---|---|---|---|---|---|---|---|---|---|---|---|---|---|---|---|---|
| | | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| UI | 1 | 0 | 0 | 0 | 0 | 0 | 0 | 8 | 0 | 24 | 16 | 8 | 0 | 24 | 16 | 8 | 0 | 24 | 16 | 8 | 0 | 24 | 16 | 8 | 0 |
| | 2 | 0 | 0 | 0 | 0 | 0 | 0 | 9 | 1 | 25 | 17 | 9 | 1 | 25 | 17 | 9 | 1 | 25 | 17 | 9 | 1 | 25 | 17 | 9 | 1 |
| | 3 | 0 | 0 | 0 | 0 | 0 | 0 | 10 | 2 | 26 | 18 | 10 | 2 | 26 | 18 | 10 | 2 | 26 | 18 | 10 | 2 | 26 | 18 | 10 | 2 |
| | 4 | 0 | 0 | 0 | 0 | 0 | 0 | 11 | 3 | 27 | 19 | 11 | 3 | 27 | 19 | 11 | 3 | 27 | 19 | 11 | 3 | 27 | 19 | 11 | 3 |
| | 5 | 0 | 0 | 0 | 0 | 0 | 0 | 12 | 4 | 28 | 20 | 12 | 4 | 28 | 20 | 12 | 4 | 28 | 20 | 12 | 4 | 28 | 20 | 12 | 4 |
| | 6 | 0 | 0 | 0 | 0 | 0 | 0 | 13 | 5 | 29 | 21 | 13 | 5 | 29 | 21 | 13 | 5 | 29 | 21 | 13 | 5 | 29 | 21 | 13 | 5 |
| | 7 | 0 | 0 | 0 | 0 | 0 | 0 | 14 | 6 | 30 | 22 | 14 | 6 | 30 | 22 | 14 | 6 | 30 | 22 | 14 | 6 | 30 | 22 | 14 | 6 |
| | 8 | 0 | 0 | 0 | 0 | 0 | 0 | 15 | 7 | 31 | 23 | 15 | 7 | 31 | 23 | 15 | 7 | 31 | 23 | 15 | 7 | 31 | 23 | 15 | 7 |
| | | UNUSED | | | | | | CRC | | LCP | | | | LCP | | | | LCP | | | | LCP | | | |

FIG. 13C

| Mapping | |
|---|---|
| Syndrome | Bit No. |
| 0x1 | 0 |
| 0x2 | 1 |
| 0x4 | 2 |
| 0x8 | 3 |
| 0x10 | 4 |
| 0x20 | 5 |
| 0x40 | 6 |
| 0x80 | 7 |
| 0x100 | 8 |
| 0x200 | 9 |
| 0x400 | 10 |
| 0x800 | 11 |
| 0x1000 | 12 |
| 0x2000 | 13 |
| 0x4000 | 14 |
| 0x8000 | 15 |
| 0xf053 | 16 |
| 0x10f5 | 17 |
| 0x21ea | 18 |
| 0x43d4 | 19 |
| 0x87a8 | 20 |
| 0xff03 | 21 |
| 0xe55 | 22 |
| 0x1caa | 23 |
| 0x3954 | 24 |
| 0x72a8 | 25 |
| 0xe550 | 26 |
| 0x3af3 | 27 |
| 0x75e6 | 28 |
| 0xebcc | 29 |
| 0x27cb | 30 |
| 0x4f96 | 31 |
| 0x9f2c | 32 |
| 0xce0b | 33 |
| 0x6c45 | 34 |
| 0xd88a | 35 |
| 0x4147 | 36 |
| 0x828e | 37 |
| 0xf54f | 38 |
| 0x1acd | 39 |

| Mapping | |
|---|---|
| Syndrome | Bit No. |
| 0x359a | 40 |
| 0x6b34 | 41 |
| 0xd668 | 42 |
| 0x5c83 | 43 |
| 0xb906 | 44 |
| 0x825f | 45 |
| 0xf4ed | 46 |
| 0x1989 | 47 |
| 0x3312 | 48 |
| 0x6624 | 49 |
| 0xcc48 | 50 |
| 0x68c3 | 51 |
| 0xd186 | 52 |
| 0x535f | 53 |
| 0xa6be | 54 |
| 0xbd2f | 55 |
| 0x8a0d | 56 |
| 0xe449 | 57 |
| 0x38c1 | 58 |
| 0x7182 | 59 |
| 0xe304 | 60 |
| 0x365b | 61 |
| 0x6cb6 | 62 |
| 0xd96c | 63 |
| 0x428b | 64 |
| 0x8516 | 65 |
| 0xfa7f | 66 |
| 0x4ad | 67 |
| 0x95a | 68 |
| 0x12b4 | 69 |
| 0x2568 | 70 |
| 0x4ad0 | 71 |
| 0x95a0 | 72 |
| 0xdb13 | 73 |
| 0x4675 | 74 |
| 0x8cea | 75 |
| 0xe987 | 76 |
| 0x235d | 77 |
| 0x46ba | 78 |
| 0x8d74 | 79 |

| Mapping | |
|---|---|
| Syndrome | Bit No. |
| 0xeabb | 80 |
| 0x2525 | 81 |
| 0x4a4a | 82 |
| 0x9494 | 83 |
| 0xd97b | 84 |
| 0x42a5 | 85 |
| 0x854a | 86 |
| 0xfac7 | 87 |
| 0x5dd | 88 |
| 0xbba | 89 |
| 0x1774 | 90 |
| 0x2ee8 | 91 |
| 0x5dd0 | 92 |
| 0xbba0 | 93 |
| 0x8713 | 94 |
| 0xfe75 | 95 |
| 0xcb9 | 96 |
| 0x1972 | 97 |
| 0x32e4 | 98 |
| 0x65c8 | 99 |
| 0xcb90 | 100 |
| 0x6773 | 101 |
| 0xcee6 | 102 |
| 0x6d9f | 103 |
| 0xdb3e | 104 |
| 0x462f | 105 |
| 0x8c5e | 106 |
| 0xe8ef | 107 |
| 0x218d | 108 |
| 0x431a | 109 |
| 0x8634 | 110 |
| 0xfc3b | 111 |
| 0x825 | 112 |
| 0x104a | 113 |
| 0x2094 | 114 |
| 0x4128 | 115 |
| 0x8250 | 116 |
| 0xf4f3 | 117 |
| 0x19b5 | 118 |
| 0x336a | 119 |

| Mapping | |
|---|---|
| Syndrome | Bit No. |
| 0x66d4 | 120 |
| 0xcda8 | 121 |
| 0x6b03 | 122 |
| 0xd606 | 123 |
| 0x5c5f | 124 |
| 0xb8be | 125 |
| 0x812f | 126 |
| 0xf20d | 127 |
| 0x1449 | 128 |
| 0x2892 | 129 |
| 0x5124 | 130 |
| 0xa248 | 131 |
| 0xb4c3 | 132 |
| 0x99d5 | 133 |
| 0xc3f9 | 134 |
| 0x77a1 | 135 |
| 0xef42 | 136 |
| 0x2ed7 | 137 |
| 0x5dae | 138 |
| 0xbb5c | 139 |
| 0x86eb | 140 |
| 0xfd85 | 141 |
| 0xb59 | 142 |
| 0x16b2 | 143 |
| 0x2d64 | 144 |
| 0x5ac8 | 145 |
| 0xb590 | 146 |
| 0x9b73 | 147 |
| 0xc6b5 | 148 |
| 0x7d39 | 149 |
| 0xfa72 | 150 |
| 0x4b7 | 151 |
| 0x96e | 152 |
| 0x12dc | 153 |
| 0x25b8 | 154 |
| 0x4b70 | 155 |
| 0x96e0 | 156 |
| 0xdd93 | 157 |
| 0x4b75 | 158 |
| 0x96ea | 159 |

| Mapping | |
|---|---|
| Syndrome | Bit No. |
| 0xdd87 | 160 |
| 0x4b5d | 161 |
| 0x96ba | 162 |
| 0xdd27 | 163 |
| 0x4a1d | 164 |
| 0x943a | 165 |
| 0xd827 | 166 |
| 0x401d | 167 |
| 0x803a | 168 |
| 0xf027 | 169 |
| 0x101d | 170 |
| 0x203a | 171 |
| 0x4074 | 172 |
| 0x80e8 | 173 |
| 0xf183 | 174 |
| 0x1355 | 175 |
| 0x26aa | 176 |
| 0x4d54 | 177 |
| 0x9aa8 | 178 |
| 0xc503 | 179 |
| 0x7a55 | 180 |
| 0xf4aa | 181 |
| 0x1907 | 182 |
| 0x320e | 183 |
| 0x641c | 184 |
| 0xc838 | 185 |
| 0x6023 | 186 |
| 0xc046 | 187 |
| 0x70df | 188 |
| 0xe1be | 189 |
| 0x332f | 190 |
| 0x665e | 191 |
| 0xccbc | 192 |
| 0x692b | 193 |
| 0xd256 | 194 |
| 0x54ff | 195 |
| 0xa9fe | 196 |
| 0xa3af | 197 |
| 0xb70d | 198 |
| 0x9e49 | 199 |

| Mapping | |
|---|---|
| Syndrome | Bit No. |
| 0xccc1 | 200 |
| 0x69d1 | 201 |
| 0xd3a2 | 202 |
| 0x5717 | 203 |
| 0xae2e | 204 |
| 0xac0f | 205 |
| 0xa84d | 206 |
| 0xa0c9 | 207 |
| 0xb1c1 | 208 |
| 0x93d1 | 209 |
| 0xd7f1 | 210 |
| 0x5fb1 | 211 |
| 0xbf62 | 212 |
| 0x8e97 | 213 |
| 0xed7d | 214 |
| 0x2aa9 | 215 |
| 0x5552 | 216 |
| 0xaaa4 | 217 |
| 0xa51b | 218 |
| 0xba65 | 219 |
| 0x8499 | 220 |
| 0xf961 | 221 |
| 0x291 | 222 |
| 0x522 | 223 |
| 0xa44 | 224 |
| 0x1488 | 225 |
| 0x2910 | 226 |
| 0x5220 | 227 |
| 0xa440 | 228 |
| 0xb8d3 | 229 |
| 0x81f5 | 230 |
| 0xf3b9 | 231 |
| 0x1721 | 232 |
| 0x2e42 | 233 |
| 0x5c84 | 234 |
| 0xb908 | 235 |
| 0x8243 | 236 |
| 0xf4d5 | 237 |
| 0x19f9 | 238 |
| 0x33f2 | 239 |

| Mapping | |
|---|---|
| Syndrome | Bit No. |
| 0x67e4 | 240 |
| 0xcfc8 | 241 |
| 0x6fc3 | 242 |
| 0xdf86 | 243 |
| 0x4f5f | 244 |
| 0x9ebe | 245 |
| 0xcd2f | 246 |
| 0x6a0d | 247 |
| 0xd41a | 248 |
| 0x5867 | 249 |
| 0xb0ce | 250 |
| 0x91cf | 251 |
| 0xd3cd | 252 |
| 0x57c9 | 253 |
| 0xaf92 | 254 |
| 0xaf77 | 255 |
| 0xaebd | 256 |
| 0xad29 | 257 |
| 0xaa01 | 258 |
| 0xa451 | 259 |
| 0xb8f1 | 260 |
| 0x81b1 | 261 |
| 0xf331 | 262 |
| 0x1631 | 263 |
| 0x2c62 | 264 |
| 0x58c4 | 265 |
| 0xb188 | 266 |
| 0x9343 | 267 |
| 0xd6d5 | 268 |
| 0x5df9 | 269 |
| 0xbbf2 | 270 |
| 0x87b7 | 271 |
| 0xff3d | 272 |
| 0xe29 | 273 |
| 0x1c52 | 274 |
| 0x38a4 | 275 |
| 0x7148 | 276 |
| 0xe290 | 277 |
| 0x3573 | 278 |
| 0x6ae6 | 279 |

| Mapping | |
|---|---|
| Syndrome | Bit No. |
| 0xd5cc | 280 |
| 0x5bcb | 281 |
| 0xb796 | 282 |
| 0x9f7f | 283 |
| 0xcead | 284 |
| 0x6d09 | 285 |
| 0xda12 | 286 |
| 0x4477 | 287 |
| 0x88ee | 288 |
| 0xe18f | 289 |
| 0x334d | 290 |
| 0x669a | 291 |
| 0xcd34 | 292 |
| 0x6a3b | 293 |
| 0xd476 | 294 |
| 0x58bf | 295 |
| 0xb17e | 296 |
| 0x92af | 297 |
| 0xd50d | 298 |
| 0x5a49 | 299 |
| 0xb492 | 300 |
| 0x9977 | 301 |
| 0xc2bd | 302 |
| 0x7529 | 303 |
| 0xea52 | 304 |
| 0x24f7 | 305 |
| 0x49ee | 306 |
| 0x93dc | 307 |
| 0xd7eb | 308 |
| 0x5f85 | 309 |
| 0xbf0a | 310 |
| 0x8e47 | 311 |
| 0xecdd | 312 |
| 0x29e9 | 313 |
| 0x53d2 | 314 |
| 0xa7a4 | 315 |
| 0xbf1b | 316 |
| 0x8e65 | 317 |
| 0xec99 | 318 |
| 0x2961 | 319 |

| Mapping | |
|---|---|
| Syndrome | Bit No. |
| 0x52c2 | 320 |
| 0xa584 | 321 |
| 0xbb5b | 322 |
| 0x86e5 | 323 |
| 0xfd99 | 324 |
| 0xb61 | 325 |
| 0x16c2 | 326 |
| 0x2d84 | 327 |
| 0x5b08 | 328 |
| 0xb610 | 329 |
| 0x9c73 | 330 |
| 0xc8b5 | 331 |
| 0x6139 | 332 |
| 0xc272 | 333 |
| 0x74b7 | 334 |
| 0xe96e | 335 |
| 0x228f | 336 |
| 0x451e | 337 |
| 0x8a3c | 338 |
| 0xe42b | 339 |
| 0x3805 | 340 |
| 0x700a | 341 |
| 0xe014 | 342 |
| 0x307b | 343 |
| 0x60f6 | 344 |
| 0xc1ec | 345 |
| 0x738b | 346 |
| 0xe716 | 347 |
| 0x3e7f | 348 |
| 0x7cfe | 349 |
| 0xf9fc | 350 |
| 0x3ab | 351 |
| 0x756 | 352 |
| 0xeac | 353 |
| 0x1d58 | 354 |
| 0x3ab0 | 355 |
| 0x7560 | 356 |
| 0xeac0 | 357 |
| 0x25d3 | 358 |
| 0x4ba6 | 359 |

| Mapping | |
|---|---|
| Syndrome | Bit No. |
| 0x974c | 360 |
| 0xdecb | 361 |
| 0x4dc5 | 362 |
| 0x9b8a | 363 |
| 0xc747 | 364 |
| 0x7edd | 365 |
| 0xfdba | 366 |
| 0xb27 | 367 |
| 0x164e | 368 |
| 0x2c9c | 369 |
| 0x5938 | 370 |
| 0xb270 | 371 |
| 0x94b3 | 372 |
| 0xd935 | 373 |
| 0x4239 | 374 |
| 0x8472 | 375 |
| 0xf8b7 | 376 |
| 0x13d | 377 |
| 0x27a | 378 |
| 0x4f4 | 379 |
| 0x9e8 | 380 |
| 0x13d0 | 381 |
| 0x27a0 | 382 |
| 0x4f40 | 383 |
| 0x9e80 | 384 |
| 0xcd53 | 385 |
| 0x6af5 | 386 |
| 0xd5ea | 387 |
| 0x5b87 | 388 |
| 0xb70e | 389 |
| 0x9e4f | 390 |
| 0xcccd | 391 |
| 0x69c9 | 392 |
| 0xd392 | 393 |
| 0x5777 | 394 |
| 0xaeee | 395 |
| 0xad8f | 396 |
| 0xab4d | 397 |
| 0xa6c9 | 398 |
| 0xbdc1 | 399 |

| Mapping | |
|---|---|
| Syndrome | Bit Nos. |
| 0x3 | 0-1 |
| 0x6 | 1-2 |
| 0xc | 2-3 |
| 0x18 | 3-4 |
| 0x30 | 4-5 |
| 0x60 | 5-6 |
| 0xc0 | 6-7 |
| 0x180 | 7-8 |
| 0x300 | 8-9 |
| 0x600 | 9-10 |
| 0xc00 | 10-11 |
| 0x1800 | 11-12 |
| 0x3000 | 12-13 |
| 0x6000 | 13-14 |
| 0xc000 | 14-15 |
| 0x7053 | 15-16 |
| 0xe0a6 | 16-17 |
| 0x311f | 17-18 |
| 0x623e | 18-19 |
| 0xc47c | 19-20 |
| 0x78ab | 20-21 |
| 0xf156 | 21-22 |
| 0x12ff | 22-23 |
| 0x25fe | 23-24 |
| 0x4bfc | 24-25 |
| 0x97f8 | 25-26 |
| 0xdfa3 | 26-27 |
| 0x4f15 | 27-28 |
| 0x9e2a | 28-29 |
| 0xcc07 | 29-30 |
| 0x685d | 30-31 |
| 0xd0ba | 31-32 |
| 0x5127 | 32-33 |
| 0xa24e | 33-34 |
| 0xb4cf | 34-35 |
| 0x99cd | 35-36 |
| 0xc3c9 | 36-37 |
| 0x77c1 | 37-38 |
| 0xef82 | 38-39 |
| 0x2f57 | 39-40 |

| Mapping | |
|---|---|
| Syndrome | Bit Nos. |
| 0x5eae | 40-41 |
| 0xbd5c | 41-42 |
| 0x8aeb | 42-43 |
| 0xe585 | 43-44 |
| 0x3b59 | 44-45 |
| 0x76b2 | 45-46 |
| 0xed64 | 46-47 |
| 0x2a9b | 47-48 |
| 0x5536 | 48-49 |
| 0xaa6c | 49-50 |
| 0xa48b | 50-51 |
| 0xb945 | 51-52 |
| 0x82d9 | 52-53 |
| 0xf5e1 | 53-54 |
| 0x1b91 | 54-55 |
| 0x3722 | 55-56 |
| 0x6e44 | 56-57 |
| 0xdc88 | 57-58 |
| 0x4943 | 58-59 |
| 0x9286 | 59-60 |
| 0xd55f | 60-61 |
| 0x5aed | 61-62 |
| 0xb5da | 62-63 |
| 0x9be7 | 63-64 |
| 0xc79d | 64-65 |
| 0x7f69 | 65-66 |
| 0xfed2 | 66-67 |
| 0xdf7 | 67-68 |
| 0x1bee | 68-69 |
| 0x37dc | 69-70 |
| 0x6fb8 | 70-71 |
| 0xdf70 | 71-72 |
| 0x4eb3 | 72-73 |
| 0x9d66 | 73-74 |
| 0xca9f | 74-75 |
| 0x656d | 75-76 |
| 0xcada | 76-77 |
| 0x65e7 | 77-78 |
| 0xcbce | 78-79 |
| 0x67cf | 79-80 |

| Mapping | |
|---|---|
| Syndrome | Bit Nos. |
| 0xcf9e | 80-81 |
| 0x6f6f | 81-82 |
| 0xdede | 82-83 |
| 0x4def | 83-84 |
| 0x9bde | 84-85 |
| 0xc7ef | 85-86 |
| 0x7f8d | 86-87 |
| 0xff1a | 87-88 |
| 0xe67 | 88-89 |
| 0x1cce | 89-90 |
| 0x399c | 90-91 |
| 0x7338 | 91-92 |
| 0xe670 | 92-93 |
| 0x3cb3 | 93-94 |
| 0x7966 | 94-95 |
| 0xf2cc | 95-96 |
| 0x15cb | 96-97 |
| 0x2b96 | 97-98 |
| 0x572c | 98-99 |
| 0xae58 | 99-100 |
| 0xace3 | 100-101 |
| 0xa995 | 101-102 |
| 0xa379 | 102-103 |
| 0xb6a1 | 103-104 |
| 0x9d11 | 104-105 |
| 0xca71 | 105-106 |
| 0x64b1 | 106-107 |
| 0xc962 | 107-108 |
| 0x6297 | 108-109 |
| 0xc52e | 109-110 |
| 0x7a0f | 110-111 |
| 0xf41e | 111-112 |
| 0x186f | 112-113 |
| 0x30de | 113-114 |
| 0x61bc | 114-115 |
| 0xc378 | 115-116 |
| 0x76a3 | 116-117 |
| 0xed46 | 117-118 |
| 0x2adf | 118-119 |
| 0x55be | 119-120 |

| Mapping | |
|---|---|
| Syndrome | Bit Nos. |
| 0xab7c | 120-121 |
| 0xa6ab | 121-122 |
| 0xbd05 | 122-123 |
| 0x8a59 | 123-124 |
| 0xe4e1 | 124-125 |
| 0x3991 | 125-126 |
| 0x7322 | 126-127 |
| 0xe644 | 127-128 |
| 0x3cdb | 128-129 |
| 0x79b6 | 129-130 |
| 0xf36c | 130-131 |
| 0x168b | 131-132 |
| 0x2d16 | 132-133 |
| 0x5a2c | 133-134 |
| 0xb458 | 134-135 |
| 0x98e3 | 135-136 |
| 0xc195 | 136-137 |
| 0x7379 | 137-138 |
| 0xe6f2 | 138-139 |
| 0x3db7 | 139-140 |
| 0x7b6e | 140-141 |
| 0xf6dc | 141-142 |
| 0x1deb | 142-143 |
| 0x3bd6 | 143-144 |
| 0x77ac | 144-145 |
| 0xef58 | 145-146 |
| 0x2ee3 | 146-147 |
| 0x5dc6 | 147-148 |
| 0xbb8c | 148-149 |
| 0x874b | 149-150 |
| 0xfec5 | 150-151 |
| 0xdd9 | 151-152 |
| 0x1bb2 | 152-153 |
| 0x3764 | 153-154 |
| 0x6ec8 | 154-155 |
| 0xdd90 | 155-156 |
| 0x4b73 | 156-157 |
| 0x96e6 | 157-158 |
| 0xdd9f | 158-159 |
| 0x4b6d | 159-160 |

| Mapping | |
|---|---|
| Syndrome | Bit Nos. |
| 0x96da | 160-161 |
| 0xdde7 | 161-162 |
| 0x4b9d | 162-163 |
| 0x973a | 163-164 |
| 0xde27 | 164-165 |
| 0x4c1d | 165-166 |
| 0x983a | 166-167 |
| 0xc027 | 167-168 |
| 0x701d | 168-169 |
| 0xe03a | 169-170 |
| 0x3027 | 170-171 |
| 0x604e | 171-172 |
| 0xc09c | 172-173 |
| 0x716b | 173-174 |
| 0xe2d6 | 174-175 |
| 0x35ff | 175-176 |
| 0x6bfe | 176-177 |
| 0xd7fc | 177-178 |
| 0x5fab | 178-179 |
| 0xbf56 | 179-180 |
| 0x8eff | 180-181 |
| 0xedad | 181-182 |
| 0x2b09 | 182-183 |
| 0x5612 | 183-184 |
| 0xac24 | 184-185 |
| 0xa81b | 185-186 |
| 0xa065 | 186-187 |
| 0xb099 | 187-188 |
| 0x9161 | 188-189 |
| 0xd291 | 189-190 |
| 0x5571 | 190-191 |
| 0xaae2 | 191-192 |
| 0xa597 | 192-193 |
| 0xbb7d | 193-194 |
| 0x86a9 | 194-195 |
| 0xfd01 | 195-196 |
| 0xa51 | 196-197 |
| 0x14a2 | 197-198 |
| 0x2944 | 198-199 |
| 0x5288 | 199-200 |

| Mapping | |
|---|---|
| Syndrome | Bit Nos. |
| 0xa510 | 200-201 |
| 0xba73 | 201-202 |
| 0x84b5 | 202-203 |
| 0xf939 | 203-204 |
| 0x221 | 204-205 |
| 0x442 | 205-206 |
| 0x884 | 206-207 |
| 0x1108 | 207-208 |
| 0x2210 | 208-209 |
| 0x4420 | 209-210 |
| 0x8840 | 210-211 |
| 0xe0d3 | 211-212 |
| 0x31f5 | 212-213 |
| 0x63ea | 213-214 |
| 0xc7d4 | 214-215 |
| 0x7ffb | 215-216 |
| 0xfff6 | 216-217 |
| 0xfbf | 217-218 |
| 0x1f7e | 218-219 |
| 0x3efc | 219-220 |
| 0x7df8 | 220-221 |
| 0xfbf0 | 221-222 |
| 0x7b3 | 222-223 |
| 0xf66 | 223-224 |
| 0x1ecc | 224-225 |
| 0x3d98 | 225-226 |
| 0x7b30 | 226-227 |
| 0xf660 | 227-228 |
| 0x1c93 | 228-229 |
| 0x3926 | 229-230 |
| 0x724c | 230-231 |
| 0xe498 | 231-232 |
| 0x3963 | 232-233 |
| 0x72c6 | 233-234 |
| 0xe58c | 234-235 |
| 0x3b4b | 235-236 |
| 0x7696 | 236-237 |
| 0xed2c | 237-238 |
| 0x2a0b | 238-239 |
| 0x5416 | 239-240 |

| Mapping | |
|---|---|
| Syndrome | Bit Nos. |
| 0xa82c | 240-241 |
| 0xa00b | 241-242 |
| 0xb045 | 242-243 |
| 0x90d9 | 243-244 |
| 0xd1e1 | 244-245 |
| 0x5391 | 245-246 |
| 0xa722 | 246-247 |
| 0xbe17 | 247-248 |
| 0x8c7d | 248-249 |
| 0xe8a9 | 249-250 |
| 0x2101 | 250-251 |
| 0x4202 | 251-252 |
| 0x8404 | 252-253 |
| 0xf85b | 253-254 |
| 0xe5 | 254-255 |
| 0x1ca | 255-256 |
| 0x394 | 256-257 |
| 0x728 | 257-258 |
| 0xe50 | 258-259 |
| 0x1ca0 | 259-260 |
| 0x3940 | 260-261 |
| 0x7280 | 261-262 |
| 0xe500 | 262-263 |
| 0x3a53 | 263-264 |
| 0x74a6 | 264-265 |
| 0xe94c | 265-266 |
| 0x22cb | 266-267 |
| 0x4596 | 267-268 |
| 0x8b2c | 268-269 |
| 0xe60b | 269-270 |
| 0x3c45 | 270-271 |
| 0x788a | 271-272 |
| 0xf114 | 272-273 |
| 0x127b | 273-274 |
| 0x24f6 | 274-275 |
| 0x49ec | 275-276 |
| 0x93d8 | 276-277 |
| 0xd7e3 | 277-278 |
| 0x5f95 | 278-279 |
| 0xbf2a | 279-280 |

| Mapping | |
|---|---|
| Syndrome | Bit Nos. |
| 0x8e07 | 280-281 |
| 0xec5d | 281-282 |
| 0x28e9 | 282-283 |
| 0x51d2 | 283-284 |
| 0xa3a4 | 284-285 |
| 0xb71b | 285-286 |
| 0x9e65 | 286-287 |
| 0xcc99 | 287-288 |
| 0x6961 | 288-289 |
| 0xd2c2 | 289-290 |
| 0x55d7 | 290-291 |
| 0xabae | 291-292 |
| 0xa70f | 292-293 |
| 0xbe4d | 293-294 |
| 0x8cc9 | 294-295 |
| 0xe9c1 | 295-296 |
| 0x23d1 | 296-297 |
| 0x47a2 | 297-298 |
| 0x8f44 | 298-299 |
| 0xeedb | 299-300 |
| 0x2de5 | 300-301 |
| 0x5bca | 301-302 |
| 0xb794 | 302-303 |
| 0x9f7b | 303-304 |
| 0xcea5 | 304-305 |
| 0x6d19 | 305-306 |
| 0xda32 | 306-307 |
| 0x4437 | 307-308 |
| 0x886e | 308-309 |
| 0xe08f | 309-310 |
| 0x314d | 310-311 |
| 0x629a | 311-312 |
| 0xc534 | 312-313 |
| 0x7a3b | 313-314 |
| 0xf476 | 314-315 |
| 0x18bf | 315-316 |
| 0x317e | 316-317 |
| 0x62fc | 317-318 |
| 0xc5f8 | 318-319 |
| 0x7ba3 | 319-320 |

| Mapping | |
|---|---|
| Syndrome | Bit Nos. |
| 0xf746 | 320-321 |
| 0x1edf | 321-322 |
| 0x3dbe | 322-323 |
| 0x7b7c | 323-324 |
| 0xf6f8 | 324-325 |
| 0x1da3 | 325-326 |
| 0x3b46 | 326-327 |
| 0x768c | 327-328 |
| 0xed18 | 328-329 |
| 0x2a63 | 329-330 |
| 0x54c6 | 330-331 |
| 0xa98c | 331-332 |
| 0xa34b | 332-333 |
| 0xb6c5 | 333-334 |
| 0x9dd9 | 334-335 |
| 0xcbe1 | 335-336 |
| 0x6791 | 336-337 |
| 0xcf22 | 337-338 |
| 0x6e17 | 338-339 |
| 0xdc2e | 339-340 |
| 0x480f | 340-341 |
| 0x901e | 341-342 |
| 0xd06f | 342-343 |
| 0x508d | 343-344 |
| 0xa11a | 344-345 |
| 0xb267 | 345-346 |
| 0x949d | 346-347 |
| 0xd969 | 347-348 |
| 0x4281 | 348-349 |
| 0x8502 | 349-350 |
| 0xfa57 | 350-351 |
| 0x4fd | 351-352 |
| 0x9fa | 352-353 |
| 0x13f4 | 353-354 |
| 0x27e8 | 354-355 |
| 0x4fd0 | 355-356 |
| 0x9fa0 | 356-357 |
| 0xcf13 | 357-358 |
| 0x6e75 | 358-359 |
| 0xdcea | 359-360 |

| Mapping | |
|---|---|
| Syndrome | Bit Nos. |
| 0x4987 | 360-361 |
| 0x930e | 361-362 |
| 0xd64f | 362-363 |
| 0x5ccd | 363-364 |
| 0xb99a | 364-365 |
| 0x8367 | 365-366 |
| 0xf69d | 366-367 |
| 0x1d69 | 367-368 |
| 0x3ad2 | 368-369 |
| 0x75a4 | 369-370 |
| 0xeb48 | 370-371 |
| 0x26c3 | 371-372 |
| 0x4d86 | 372-373 |
| 0x9b0c | 373-374 |
| 0xc64b | 374-375 |
| 0x7cc5 | 375-376 |
| 0xf98a | 376-377 |
| 0x347 | 377-378 |
| 0x68e | 378-379 |
| 0xd1c | 379-380 |
| 0x1a38 | 380-381 |
| 0x3470 | 381-382 |
| 0x68e0 | 382-383 |
| 0xd1c0 | 383-384 |
| 0x53d3 | 384-385 |
| 0xa7a6 | 385-386 |
| 0xbf1f | 386-387 |
| 0x8e6d | 387-388 |
| 0xec89 | 388-389 |
| 0x2941 | 389-390 |
| 0x5282 | 390-391 |
| 0xa504 | 391-392 |
| 0xba5b | 392-393 |
| 0x84e5 | 393-394 |
| 0xf999 | 394-395 |
| 0x361 | 395-396 |
| 0x6c2 | 396-397 |
| 0xd84 | 397-398 |
| 0x1b08 | 398-399 |

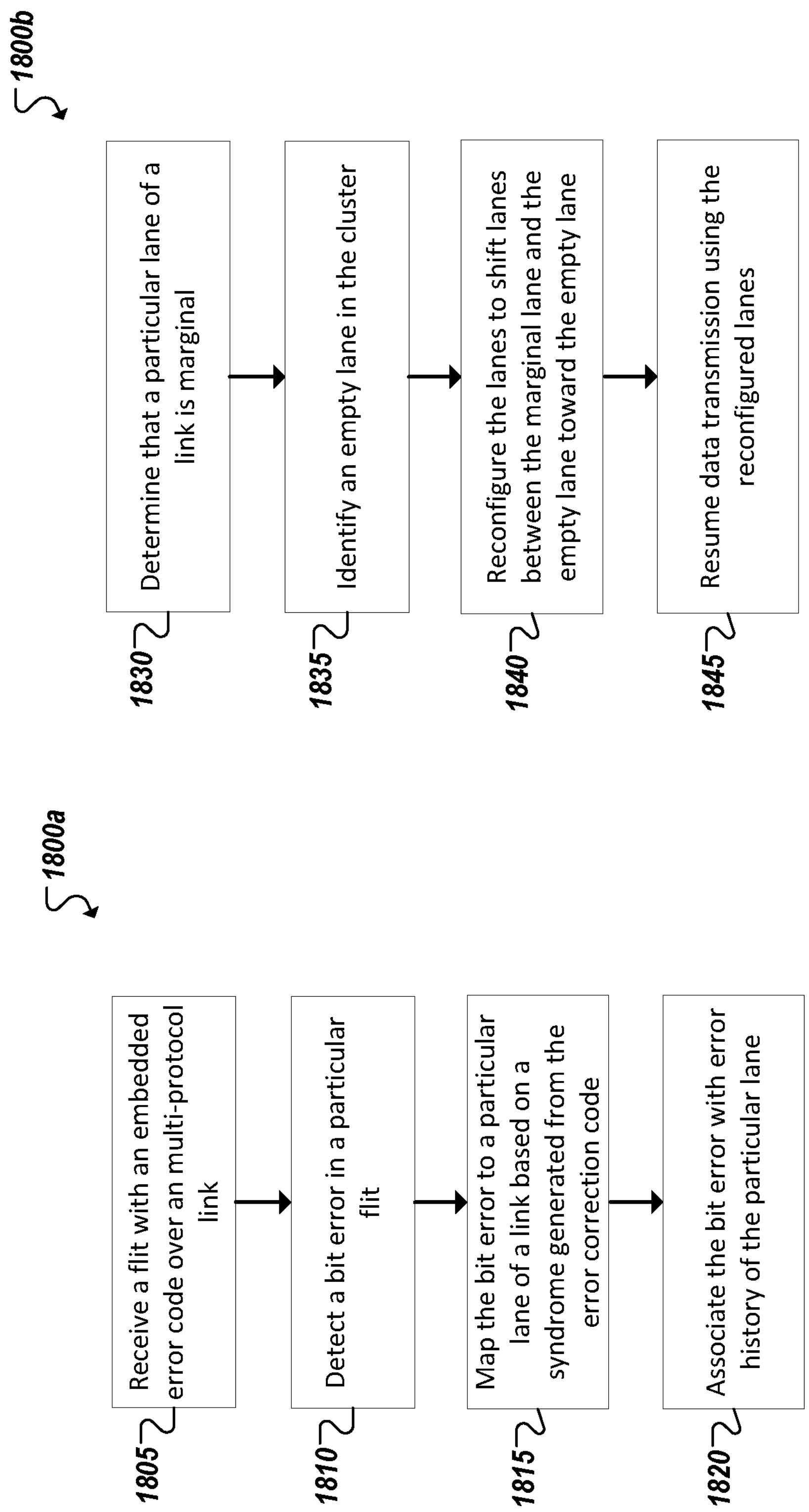
1800a
1805
Receive a flit with an embedded error code over an multi-protocol link
1810
Detect a bit error in a particular flit
1815
Map the bit error to a particular lane of a link based on a syndrome generated from the error correction code
1820
Associate the bit error with error history of the particular lane
FIG. 18A
1800b
1830
Determine that a particular lane of a link is marginal
1835
Identify an empty lane in the cluster
1840
Reconfigure the lanes to shift lanes between the marginal lane and the empty lane toward the empty lane
1845
Resume data transmission using the reconfigured lanes
FIG. 18B

MULTICHIP PACKAGE LINK ERROR DETECTION

CROSS-REFERENCE TO RELATED APPLICATIONS

This Application is a continuation (and claims the benefit of priority under 35 U.S.C. § 120) of U.S. patent application Ser. No. 15/741,967, filed Jan. 4, 2018, and entitled "Multichip Package Link Error Detection", which is a national stage application under 35 U.S.C. § 371 of PCT Application No. PCT/US2015/052509, filed on Sep. 26, 2015 and entitled "Multichip Package Link Error Detection". The disclosures of the prior applications are considered part of and are hereby incorporated by reference in their entirety in the disclosure of this application.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 13A-13C are example bit mappings of data on lanes of an example MCPL.

FIG. 14-1, 14-2, 14-3 illustrates an example syndrome decoder table.

FIG. 15-1, 15-2, 15-3 illustrates another example of a syndrome decoder table.

FIGS. 18A-18B are simplified flowcharts illustrating techniques for handling error on a MCPL.

Like reference numbers and designations in the various drawings indicate like elements.

DETAILED DESCRIPTION

Figure 1:
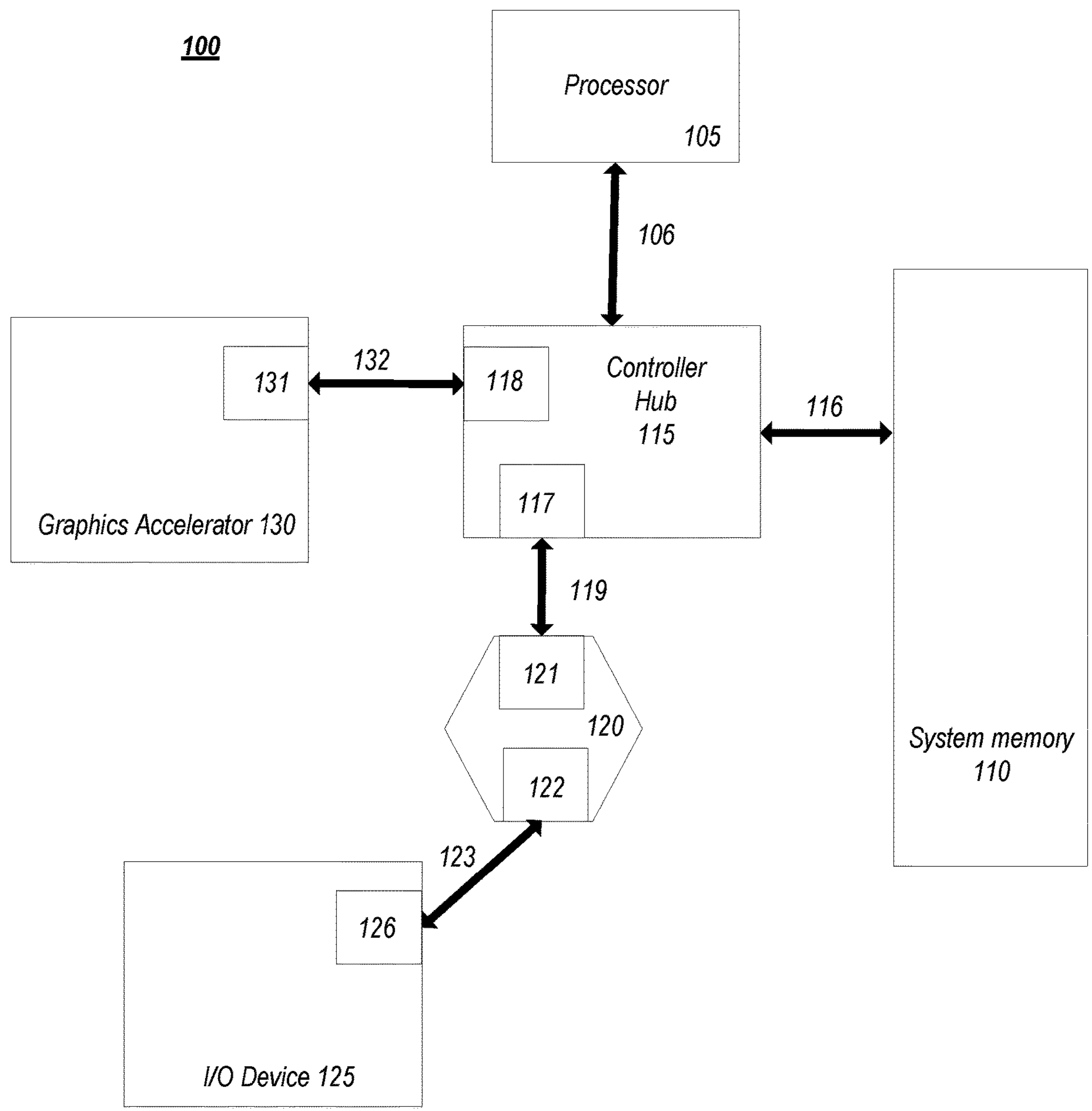
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
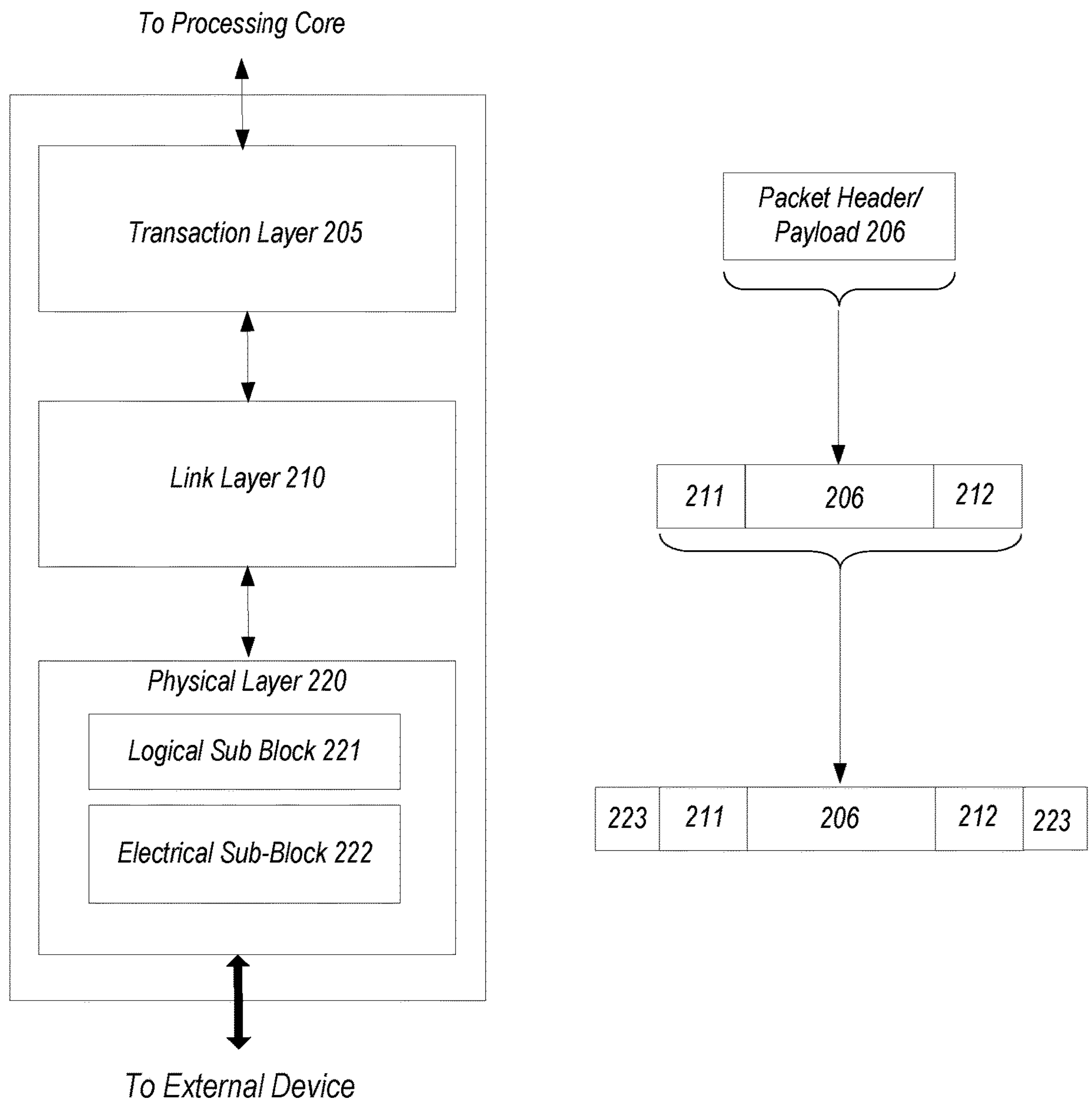
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
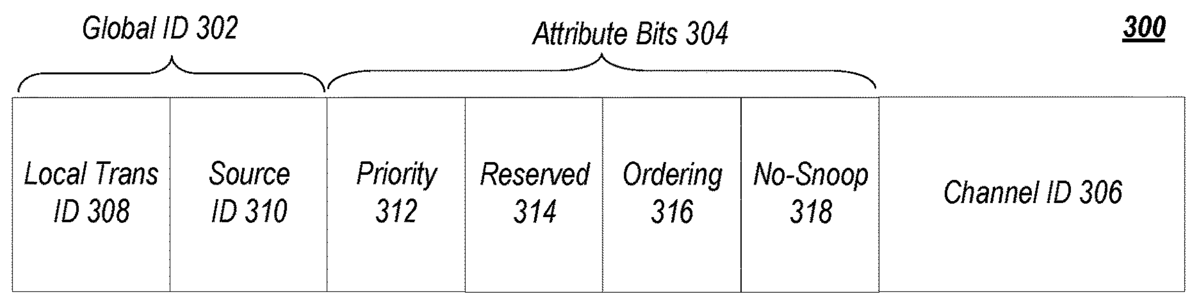
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8 b/10 b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
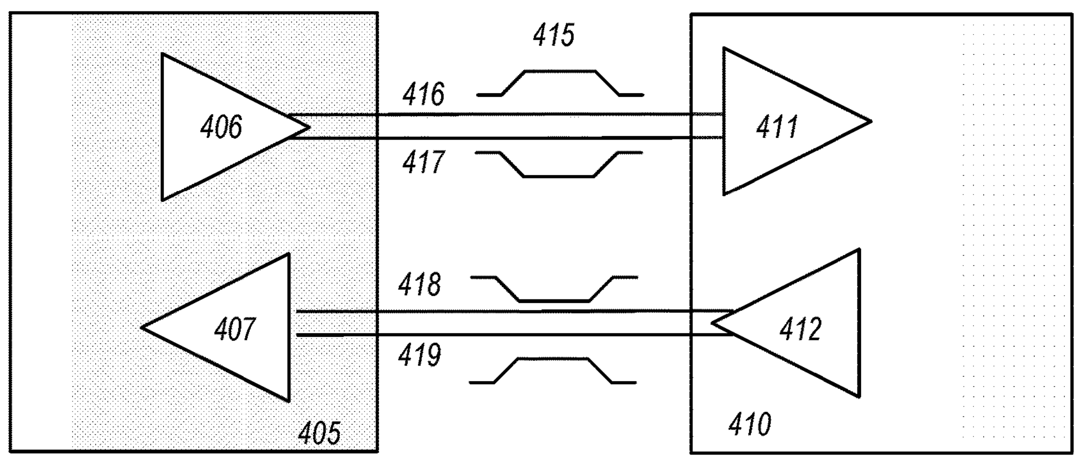
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 5:
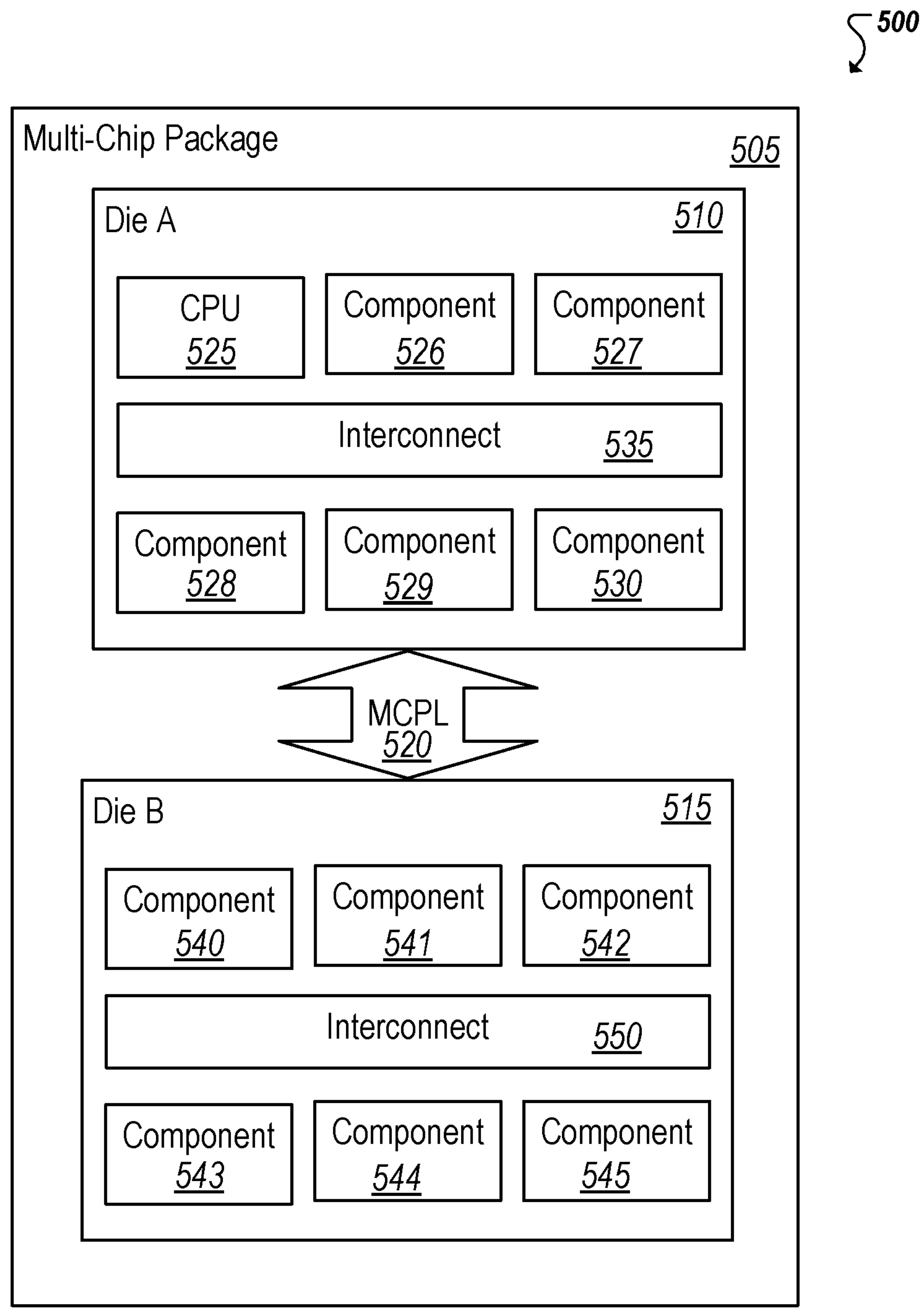
FIG. 5 illustrates an embodiment of a multichip package.

FIG. 5 is a simplified block diagram 500 illustrating an example multi-chip package 505 that includes two or more chips, or dies, (e.g., 510, 515) communicatively connected using an example multi-chip package link (MCPL) 520. While FIG. 5 illustrates an example of two (or more) dies that are interconnected using an example MCPL 520, it should be appreciated that the principles and features described herein regarding implementations of an MCPL can be applied to any interconnect or link connecting a die (e.g., 510) and other components, including connecting two or more dies (e.g., 510, 515), connecting a die (or chip) to another component off-die, connecting a die to another device or die off-package (e.g., 505), connecting die to a BGA package, implementation of a Patch on Interposer (POINT), among potentially other examples.

Generally, a multichip package (e.g., 505) can be an electronic package where multiple integrated circuits (ICs), semiconductor dies or other discrete components (e.g., 510, 515) are packaged onto a unifying substrate (e.g., silicon or other semiconductor substrate), facilitating the combined components' use as a single component (e.g., as though a larger IC). In some instances, the larger components (e.g., dies 510, 515) can themselves be IC systems, such as systems on chip (SoC), multiprocessor chips, or other components that include multiple components (e.g., 525-530 and 540-545) on the device, for instance, on a single die (e.g., 510, 515). Multichip packages 505 can provide flexibility for building complex and varied systems from potentially multiple discrete components and systems. For instance, each of dies 510, 515 may be manufactured or otherwise provided by two different entities, with the silicon substrate of the package 505 provided by yet a third entity, among many other examples. Further, dies and other components within a multichip package 505 can themselves include interconnect or other communication fabrics (e.g., 535, 550) providing the infrastructure for communication between components (e.g., 525-530 and 540-545) within the device (e.g., 510, 515 respectively). The various components and interconnects (e.g., 535, 550) may potentially support or use multiple different protocols. Further, communication between dies (e.g., 510, 515) can potentially include transactions between the various components on the dies over multiple different protocols. Designing mechanisms to provide communication between chips (or dies) on a multichip package can be challenging, with traditional solutions employing highly specialized, expensive, and package-specific solutions based on the specific combinations of components (and desired transactions) sought to be interconnected.

The examples, systems, algorithms, apparatus, logic, and features described within this Specification can address at least some of the issues identified above, including potentially many others not explicitly mentioned herein. For instance, in some implementations, a high bandwidth, low power, low latency interface can be provided to connect a host device (e.g., a CPU) or other device to a companion chip that sits in the same package as the host. Such a multichip package link (MCPL) can support multiple package options, multiple I/O protocols, as well as Reliability, Availability, and Serviceability (RAS) features. Further, the physical layer (PHY) can include an electrical layer and logic layer and can support longer channel lengths, including channel lengths up to, and in some cases exceeding, approximately 45 mm. In some implementations, an example MCPL can operate at high data rates, including data rates exceeding 8-10 Gb/s.

In one example implementation of an MCPL, a PHY electrical layer can improve upon traditional multi-channel interconnect solutions (e.g., multi-channel DRAM I/O), extending the data rate and channel configuration, for instance, by a number of features including, as examples, regulated mid-rail termination, low power active crosstalk cancellation, circuit redundancy, per bit duty cycle correction and deskew, line coding, and transmitter equalization, among potentially other examples.

In one example implementation of an MCPL, a PHY logical layer can be implemented that can further assist (e.g., electrical layer features) in extending the data rate and channel configuration while also enabling the interconnect to route multiple protocols across the electrical layer. Such implementations can provide and define a modular common physical layer that is protocol agnostic and architected to work with potentially any existing or future interconnect protocol.

Figure 6:
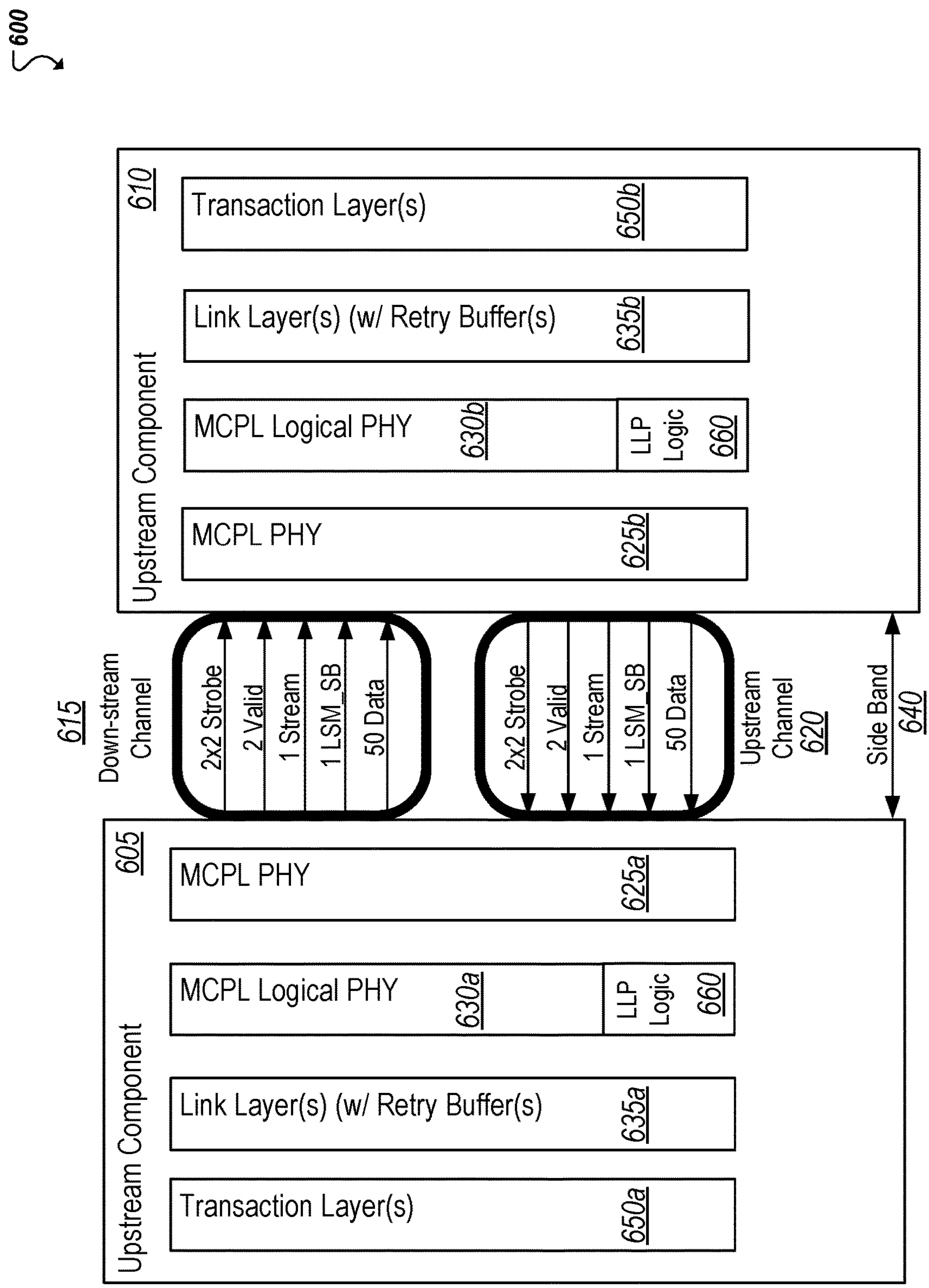
FIG. 6 is a simplified block diagram of a multichip package link (MCPL).

Turning to FIG. 6, a simplified block diagram 600 is shown representing at least a portion of a system including an example implementation of a multichip package link (MCPL). An MCPL can be implemented using physical electrical connections (e.g., wires implemented as lanes) connecting a first device 605 (e.g., a first die including one or more sub-components) with a second device 610 (e.g., a second die including one or more other sub-components). In the particular example shown in the high-level representation of diagram 600, all signals (in channels 615, 620) can be unidirectional and lanes can be provided for the data signals to have both an upstream and downstream data transfer. While the block diagram 600 of FIG. 6, refers to the first component 605 as the upstream component and the second component 610 as the downstream components, and physical lanes of the MCPL used in sending data as a downstream channel 615 and lanes used for receiving data (from component 610) as an upstream channel 620, it should be appreciated that the MCPL between devices 605, 610 can be used by each device to both send and receive data between the devices.

In one example implementation, an MCPL can provide a physical layer (PHY) including the electrical MCPL PHY 625*a, b* (or, collectively, 625) and executable logic implementing MCPL logical PHY 630*a, b* (or, collectively, 630). Electrical, or physical, PHY 625 can provide the physical connection over which data is communicated between devices 605, 610. Signal conditioning components and logic can be implemented in connection with the physical PHY 625 in order to establish high data rate and channel configuration capabilities of the link, which in some applications can involve tightly clustered physical connections at lengths of approximately 45 mm or more. The logical PHY 630 can include logic for facilitating clocking, link state management (e.g., for link layers 635*a*, 635*b*), and protocol multiplexing between potentially multiple, different protocols used for communications over the MCPL.

In one example implementation, physical PHY 625 can include, for each channel (e.g., 615, 620) a set of data lanes, over which in-band data can be sent. In this particular example, 50 data lanes are provided in each of the upstream and downstream channels 615, 620, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 640, which, in some examples, can be a bi-directional lower frequency control signal link used to coordinate state transitions and other attributes of the MCPL connecting devices 605, 610, among other examples.

As noted above, multiple protocols can be supported using an implementation of MCPL. Indeed, multiple, independent transaction layers 650*a*, 650*b* can be provided at each device 605, 610. For instance, each device 605, 610 may support and utilize two or more protocols, such as PCI, PCIe, QPI, Intel In-Die Interconnect (IDI), among others. IDI is a coherent protocol used on-die to communicate between cores, Last Level Caches (LLCs), memory, graphics, and IO controllers. Other protocols can also be supported including Ethernet protocol, Infiniband protocols, and other PCIe fabric based protocols. The combination of the Logical PHY and physical PHY can also be used as a die-to-die interconnect to connect a SerDes PHY (PCIe, Ethernet, Infiniband or other high speed SerDes) on one Die to its upper layers that are implemented on the other die, among other examples.

Logical PHY 630 can support multiplexing between these multiple protocols on an MCPL. For instance, the dedicated stream lane can be used to assert an encoded stream signal that identifies which protocol is to apply to data sent substantially concurrently on the data lanes of the channel. Further, logical PHY 630 can be used to negotiate the various types of link state transitions that the various protocols may support or request. In some instances, LSM_SB signals sent over the channel's dedicated LSM_SB lane can be used, together with side band link 640 to communicate and negotiate link state transitions between the devices 605, 610. Further, link training, error detection, skew detection, deskewing, and other functionality of traditional interconnects can be replaced or governed, in part using logical PHY 630. For instance, valid signals sent over one or more dedicated valid signal lanes in each channel can be used to signal link activity, detect skew, link errors, and realize other features, among other examples. In the particular example of FIG. 6, multiple valid lanes are provided per channel. For instance, data lanes within a channel can be bundled or clustered (physically and/or logically) and a valid lane can be provided for each cluster. Further, multiple strobe lanes can be provided, in some cases, also to provide a dedicated strobe signal for each cluster in a plurality of data lane clusters in a channel, among other examples.

As noted above, logical PHY 630 can be used to negotiate and manage link control signals sent between devices connected by the MCPL. In some implementations, logical PHY 630 can include link layer packet (LLP) generation logic 660 that can be used to send link layer control messages over the MCPL (i.e., in band). Such messages can be sent over data lanes of the channel, with the stream lane identifying that the data is link layer-to-link layer messaging, such as link layer control data, among other examples. Link layer messages enabled using LLP module 660 can assist in the negotiation and performance of link layer state transitioning, power management, loopback, disable, re-centering, scrambling, among other link layer features between the link layers 635*a*, 635*b* of devices 605, 610 respectively.

Figure 7:
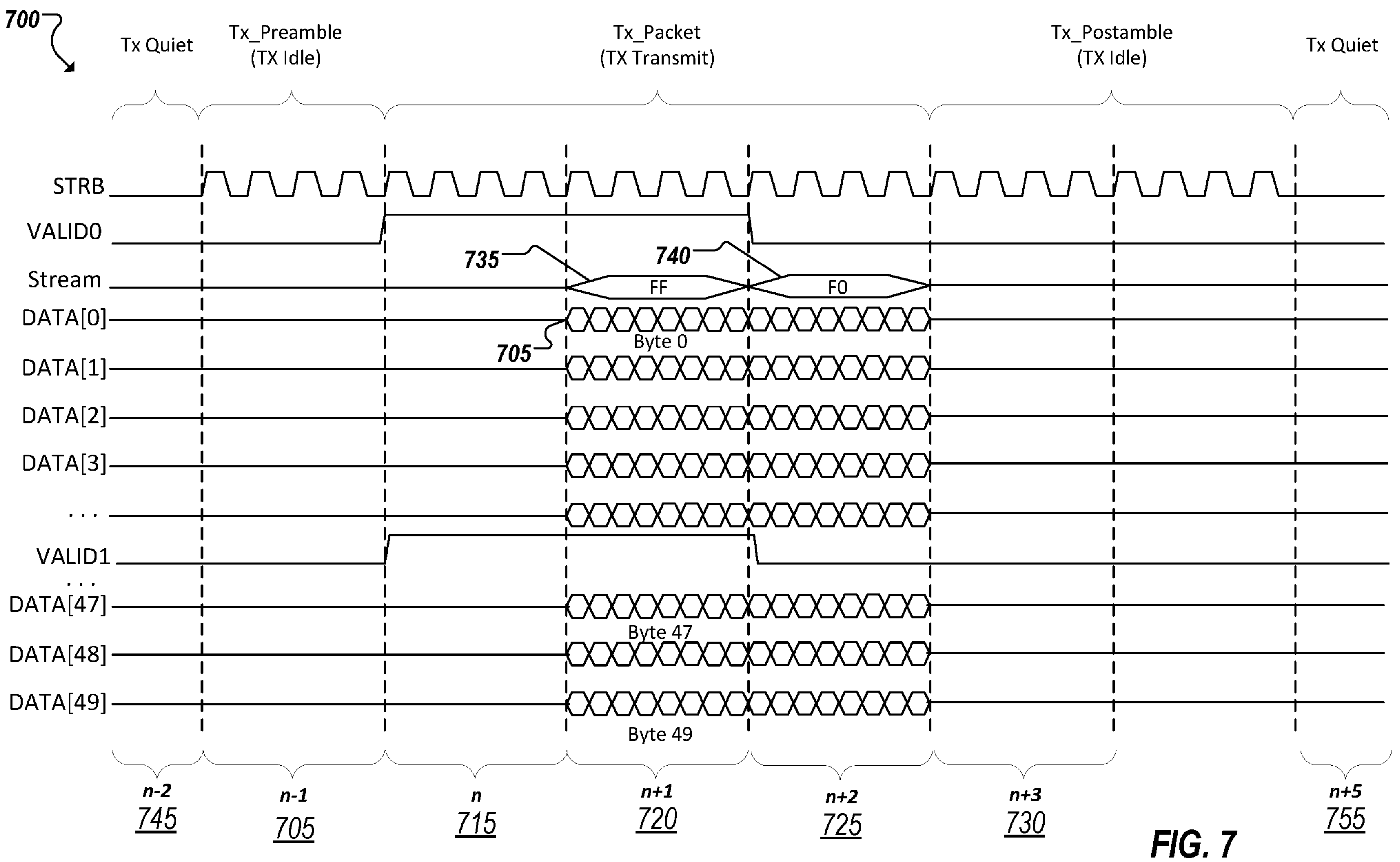
FIG. 7 is a representation of example signaling on an example MCPL.

Turning to FIG. 7, a diagram 700 is shown representing example signaling using a set of lanes (e.g., 615, 620) in a particular channel of an example MCPL. In the example of FIG. 7, two clusters of twenty-five (25) data lanes are provided for fifty (50) total data lanes in the channel. A portion of the lanes are shown, while others (e.g., DATA[4-46] and a second strobe signal lane (STRB)) are omitted (e.g., as redundant signals) for convenience in illustrating the particular example. When the physical layer is in an active state (e.g., not powered off or in a low power mode (e.g., an L1 state)), strobe lanes (STRB) can be provided with a synchronous clock signal. In some implementations, data can be sent on both the rising and falling edges of the strobe. Each edge (or half clock cycle) can demarcate a unit interval (UI). Accordingly, in this example, a bit (e.g., 705) can be sent on each lane, allowing for a byte to be sent every 8 UI. A byte time period 710 can be defined as 8 UI, or the time for sending a byte on a single one of the data lanes (e.g., DATA[0-49]).

In some implementations, a valid signal, sent on one or more dedicated valid signal channels (e.g., VALID0, VALID1), can serve as a leading indicator for the receiving device to identify, when asserted (high), to the receiving device, or sink, that data is being sent from the sending device, or source, on data lanes (e.g., DATA[0-49]) during the following time period, such as a byte time period 710. Alternatively, when the valid signal is low, the source indicates to the sink that the sink will not be sending data on the data lanes during the following time period. Accordingly, when the sink logical PHY detects that the valid signal is not asserted (e.g., on lanes VALID0 and VALID1), the sink can disregard any data that is detected on the data lanes (e.g., DATA[0-49]) during the following time period. For instance, cross talk noise or other bits may appear on one or more of the data lanes when the source, in fact, is not sending any data. By virtue of a low, or non-asserted, valid signal during the previous time period (e.g., the previous byte time period), the sink can determine that the data lanes are to be disregarded during the following time period.

Data sent on each of the lanes of the MCPL can be strictly aligned to the strobe signal. A time period can be defined based on the strobe, such as a byte time period, and each of these periods can correspond to a defined window in which signals are to be sent on the data lanes (e.g., DATA[0-49]), the valid lanes (e.g., VALID1, VALID2), and stream lane (e.g., STREAM). Accordingly, alignment of these signals can enable identification that a valid signal in a previous time period window applies to data in the following time period window, and that a stream signal applies to data in the same time period window. The stream signal can be an encoded signal (e.g., 1 byte of data for a byte time period window), that is encoded to identify the protocol that applies to data being sent during the same time period window.

To illustrate, in the particular example of FIG. 7, a byte time period window is defined. A valid is asserted at a time period window n (715), before any data is injected on data lanes DATA[0-49]. At the following time period window n+1 (720) data is sent on at least some of the data lanes. In this case, data is sent on all fifty data lanes during n+1 (720). Because a valid was asserted for the duration of the preceding time period window n (715), the sink device can validate the data received on data lanes DATA[0-49] during time period window n+1 (720). Additionally, the leading nature of the valid signal during time period window n (715) allows the receiving device to prepare for the incoming data. Continuing with the example of FIG. 7, the valid signal remains asserted (on VALID1 and VALID2) during the duration of time period window n+1 (720), causing the sink device to expect the data sent over data lanes DATA[0-49] during time period window n+2 (725). If the valid signal were to remain asserted during time period window n+2 (725), the sink device could further expect to receive (and process) additional data sent during an immediately subsequent time period window n+3 (730). In the example of FIG. 7, however, the valid signal is de-asserted during the duration of time period window n+2 (725), indicating to the sink device that no data will be sent during time period window n+3 (730) and that any bits detected on data lanes DATA [0-49] should be disregarded during time period window n+3 (730).

As noted above, multiple valid lanes and strobe lanes can be maintained per channel. This can assist, among other advantages, with maintaining circuit simplicity and synchronization amid the clusters of relatively lengthy physical lanes connecting the two devices. In some implementations, a set of data lanes can be divided into clusters of data lanes. For instance, in the example of FIG. 7, data lanes DATA[0-49] can be divided into two twenty-five lane clusters and each cluster can have a dedicated valid and strobe lane. For instance, valid lane VALID1 can be associated with data lanes DATA[0-24] and valid lane VALID2 can be associated with data lanes DATA[25-49]. The signals on each "copy" of the valid and strobe lanes for each cluster can be identical.

As introduced above, data on stream lane STREAM can be used to indicate to the receiving logical PHY what protocol is to apply to corresponding data being sent on data lanes data lanes DATA[0-49]. In the example of FIG. 7, a stream signal is sent on STREAM during the same time period window as data on data lanes DATA[0-49] to indicate the protocol of the data on the data lanes. In alternative implementations, the stream signal can be sent during a preceding time period window, such as with corresponding valid signals, among other potential modifications. However, continuing with the example of FIG. 7, a stream signal 735 is sent during time period window n+1 (720) that is encoded to indicate the protocol (e.g., PCIe, PCI, IDI, QPI, etc.) that is to apply to the bits sent over data lanes DATA[0-49] during time period window n+1 (720). Similarly, another stream signal 740 can be sent during the subsequent time period window n+2 (725) to indicate the protocol that applies to the bits sent over data lanes DATA [0-49] during time period window n+2 (725), and so on. In some cases, such as the example of FIG. 7 (where both stream signals 735, 740 have the same encoding, binary FF), data in sequential time period windows (e.g., n+1 (720) and n+2 (725)) can belong to the same protocol. However, in other cases, data in sequential time period windows (e.g., n+1 (720) and n+2 (725)) can be from different transactions to which different protocols are to apply, and stream signals (e.g., 735, 740) can be encoded accordingly to identify the different protocols applying to the sequential bytes of data on the data lanes (e.g., DATA[0-49]), among other examples.

In some implementations, a low power or idle state can be defined for the MCPL. For instance, when neither device on the MCPL is sending data, the physical layer (electrical and logical) of MCPL can go to an idle or low power state. For instance, in the example of FIG. 7, at time period window n−2 (745), the MCPL is in a quiet or idle state and the strobe is disabled to save power. The MCPL can transition out of low-power or idle mode, awaking the strobe at time period window time period window n−1 (e.g., 705). The strobe can complete a transmission preamble (e.g., to assist in waking and synchronizing each of the lanes of the channel, as well as the sink device), beginning the strobe signal prior to any other signaling on the other non-strobe lanes. Following this time period window n−1 (705), the valid signal can be asserted at time period window n (715) to notify the sink that data is forthcoming in the following time period window n+1 (720), as discussed above.

The MCPL may re-enter a low power or idle state (e.g., an L1 state) following the detection of idle conditions on the valid lanes, data lanes, and/or other lanes of the MCPL channel. For instance, no signaling may be detected beginning at time period window n+3 (730) and going forward. Logic on either the source or sink device can initiate transition back into a low power state leading again (e.g., time period window n+5 (755)) to the strobe going idle in a power savings mode, among other examples and principles (including those discussed later herein).

Electrical characteristics of the physical PHY can include one or more of single-ended signaling, half-rate forwarded clocking, matching of interconnect channel as well as on-chip transport delay of transmitter (source) and receiver (sink), optimized electrostatic discharge (ESD) protection, pad capacitance, among other features. Further, an MCPL can be implemented to achieve higher data rate (e.g., approaching 16 Gb/s) and energy efficiency characteristics than traditional package I/O solutions.

Figure 8:
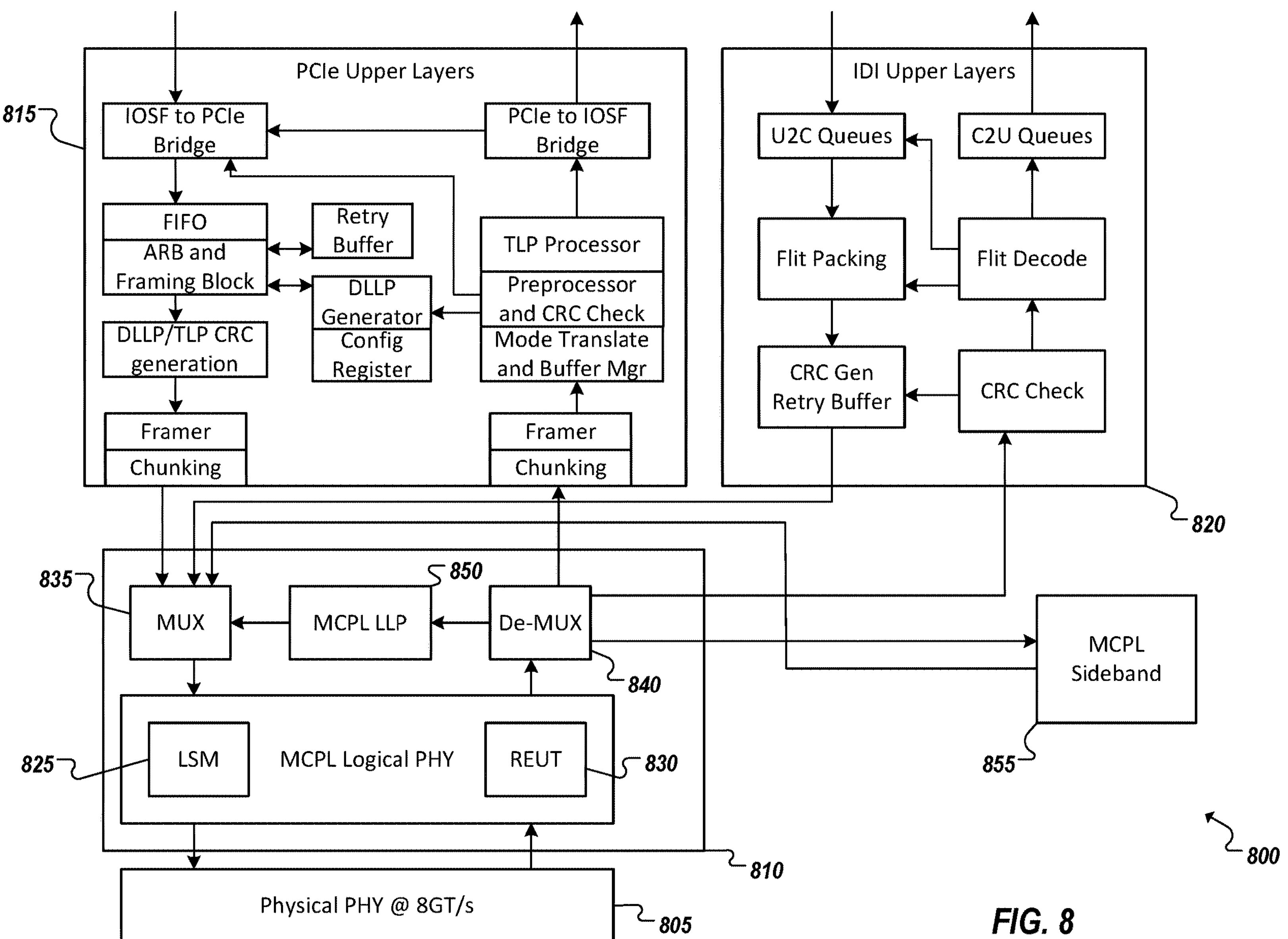
FIG. 8 is a simplified block diagram of an MCPL.

Turning to FIG. 8, a simplified block diagram 800 is shown illustrating an example logical PHY of an example MCPL. A physical PHY 805 can connect to a die that includes logical PHY 810 and additional logic supporting a link layer of the MCPL. The die, in this example, can further include logic to support multiple different protocols on the MCPL. For instance, in the example of FIG. 8, PCIe logic 815 can be provided as well as IDI logic 820, such that the dies can communicate using either PCIe or IDI over the same MCPL connecting the two dies, among potentially many other examples, including examples where more than two protocols or protocols other than PCIe and IDI are supported over the MCPL. Various protocols supported between the dies can offer varying levels of service and features.

Logical PHY 810 can include link state machine management logic 825 for negotiating link state transitions in connection with requests of upper layer logic of the die (e.g., received over PCIe or IDI). Logical PHY 810 can further include link testing and debug logic (e.g., 830) ion some implementations. As noted above, an example MCPL can support control signals that are sent between dies over the MCPL to facilitate protocol agnostic, high performance, and power efficiency features (among other example features) of the MCPL. For instance, logical PHY 810 can support the generation and sending, as well as the receiving and processing of valid signals, stream signals, and LSM sideband signals in connection with the sending and receiving of data over dedicated data lanes, such as described in examples above.

In some implementations, multiplexing (e.g., 835) and demultiplexing (e.g., 840) logic can be included in, or be otherwise accessible to, logical PHY 810. For instance, multiplexing logic (e.g., 835) can be used to identify data (e.g., embodied as packets, messages, etc.) that is to be sent out onto the MCPL. The multiplexing logic 835 can identify the protocol governing the data and generate a stream signal that is encoded to identify the protocol. For instance, in one example implementation, the stream signal can be encoded as a byte of two hexadecimal symbols (e.g., IDI: FFh; PCIe: F0h; LLP: AAh; sideband: 55h; etc.), and can be sent during the same window (e.g., a byte time period window) of the data governed by the identified protocol. Similarly, demultiplexing logic 840 can be employed to interpret incoming stream signals to decode the stream signal and identify the protocol that is to apply to data concurrently received with the stream signal on the data lanes. The demultiplexing logic 840 can then apply (or ensure) protocol-specific link layer handling and cause the data to be handled by the corresponding protocol logic (e.g., PCIe logic 815 or IDI logic 820).

Logical PHY 810 can further include link layer packet logic 850 that can be used to handle various link control functions, including power management tasks, loopback, disable, re-centering, scrambling, etc. LLP logic 850 can facilitate link layer-to-link layer messages over MCLP, among other functions. Data corresponding to the LLP signaling can be also be identified by a stream signal sent on a dedicated stream signal lane that is encoded to identify that the data lanes LLP data. Multiplexing and demultiplexing logic (e.g., 835, 840) can also be used to generate and interpret the stream signals corresponding to LLP traffic, as well as cause such traffic to be handled by the appropriate die logic (e.g., LLP logic 850). Likewise, as some implementations of an MCLP can include a dedicated sideband (e.g., sideband 855 and supporting logic), such as an asynchronous and/or lower frequency sideband channel, among other examples.

Logical PHY logic 810 can further include link state machine management logic that can generate and receive (and use) link state management messaging over a dedicated LSM sideband lane. For instance, an LSM sideband lane can be used to perform handshaking to advance link training state, exit out of power management states (e.g., an L1 state), among other potential examples. The LSM sideband signal can be an asynchronous signal, in that it is not aligned with the data, valid, and stream signals of the link, but instead corresponds to signaling state transitions and align the link state machine between the two die or chips connected by the link, among other examples. Providing a dedicated LSM sideband lane can, in some examples, allow for traditional squelch and received detect circuits of an analog front end (AFE) to be eliminated, among other example benefits.

Figure 9:
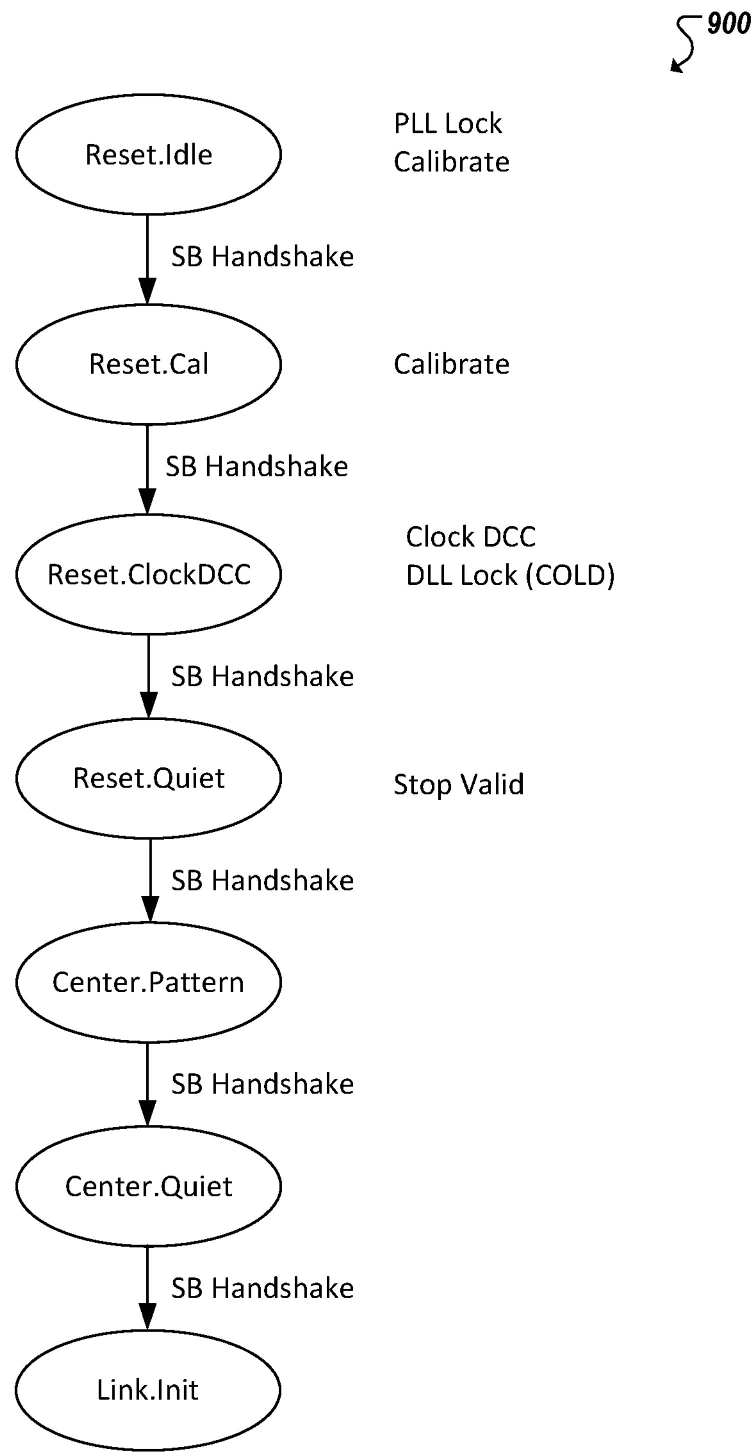
FIG. 9 is a representation of a portion of an example link state machine.

Turning to FIG. 9, a simplified link state machine transition diagram 900 is shown together with sideband handshaking utilized between the state transitions. For instance, a Reset.Idle state (e.g., where phase lock loop (PLL) lock calibration is performed) can transition, through a sideband handshake, to a Reset.Cal state (e.g., where the link is further calibrated). Reset.Cal can transition, through a sideband handshake, to a Reset.ClockDCC state (e.g., where duty cycle correction (DCC) and delay-locked looping (DLL) lock can be performed). An additional handshake can be performed to transition from Reset.ClockDCC to a Reset.Quiet state (e.g., to deassert the Valid signal). To assist in alignment of signaling on the lanes of the MCPL, the lanes can be centered through a Center.Pattern state.

Figure 16:
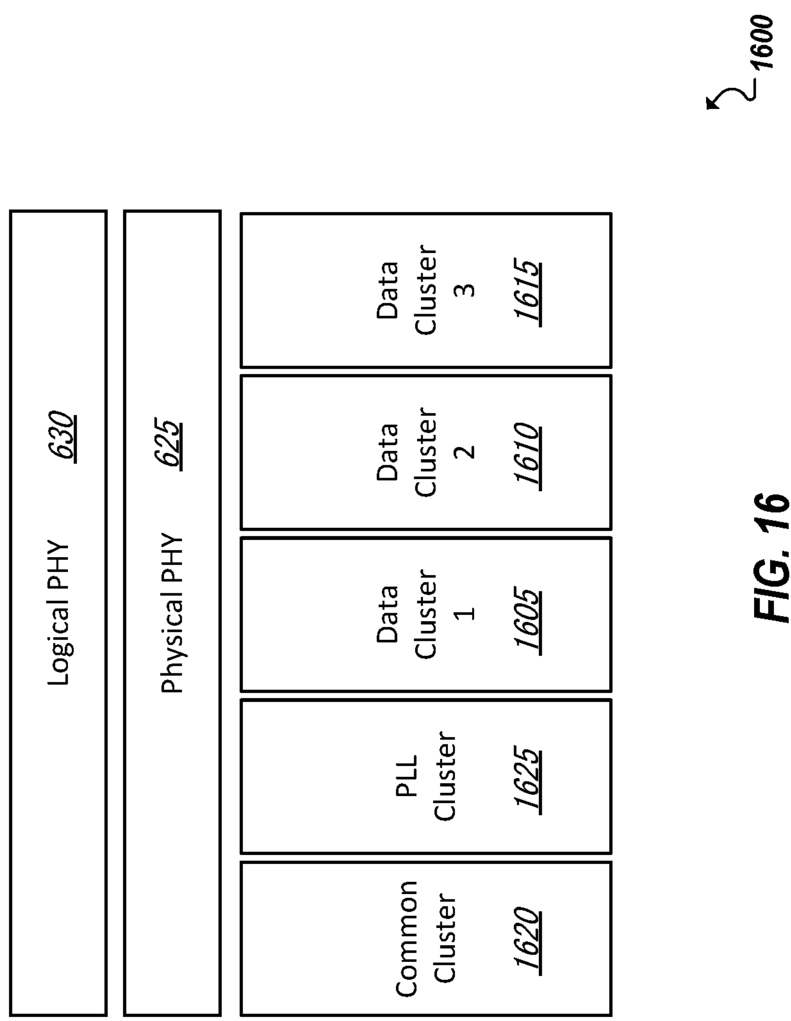
FIG. 16 is a block diagram illustrating an example implementation of an MCPL.

In some implementations, as shown in the example of FIG. 16, during the Center.Pattern state, the transmitter can generate training patterns or other data. The receiver can condition its receiver circuitry to receive such training patterns, for instance, by setting the phase interpolator position and vref position and setting the comparator. The receiver can continuously compare the patterns received with expected patterns and store the result in a register. After one set of patterns are complete, the receiver can increment the phase interpolator setting keeping the vref the same. The test pattern generation and comparison process can continue and new compare results can be stored in the register with the procedure repeatedly stepping through all phase interpolator values and through all values of vref. The Center.Quiet state can be entered when the pattern generation and comparison process is all complete. Following the centering of the lanes through the Center.Pattern and Center Quiet link states, a sideband handshake (e.g., using an LSM sideband signal over the dedicated LSM sideband lane of the link) can be facilitated to transition to a Link.Init state to initialize the MCPL and enable sending of data on the MCPL.

Returning momentarily to the discussion of FIG. 15, as noted above, sideband handshakes can be used to facilitate link state machine transitions between dies or chips in a multi-chip package. For instance, signals on the LSM sideband lanes of an MCPL can be used to synchronize the state machine transitions across the die. For example, when the conditions to exit a state (e.g., Reset.Idle) are met, the side that met those conditions can assert, on its outbound LSM_SB lane, an LSM sideband signal and wait for the other remote die to reach the same condition and assert an LSM sideband signal on its LSM_SB lane. When both LSM_SB signals are asserted the link state machine of each respective die can transition to the next state (e.g., a Reset.Cal state). A minimum overlap time can be defined during which both LSM_SB signals should be kept asserted prior to transitioning state. Further, a minimum quiesce time can be defined after LSM_SB is de-asserted to allow for accurate turn-around detection. In some implementations, every link state machine transition can be conditioned on and facilitated by such LSM_SB handshakes.

Figure 10:
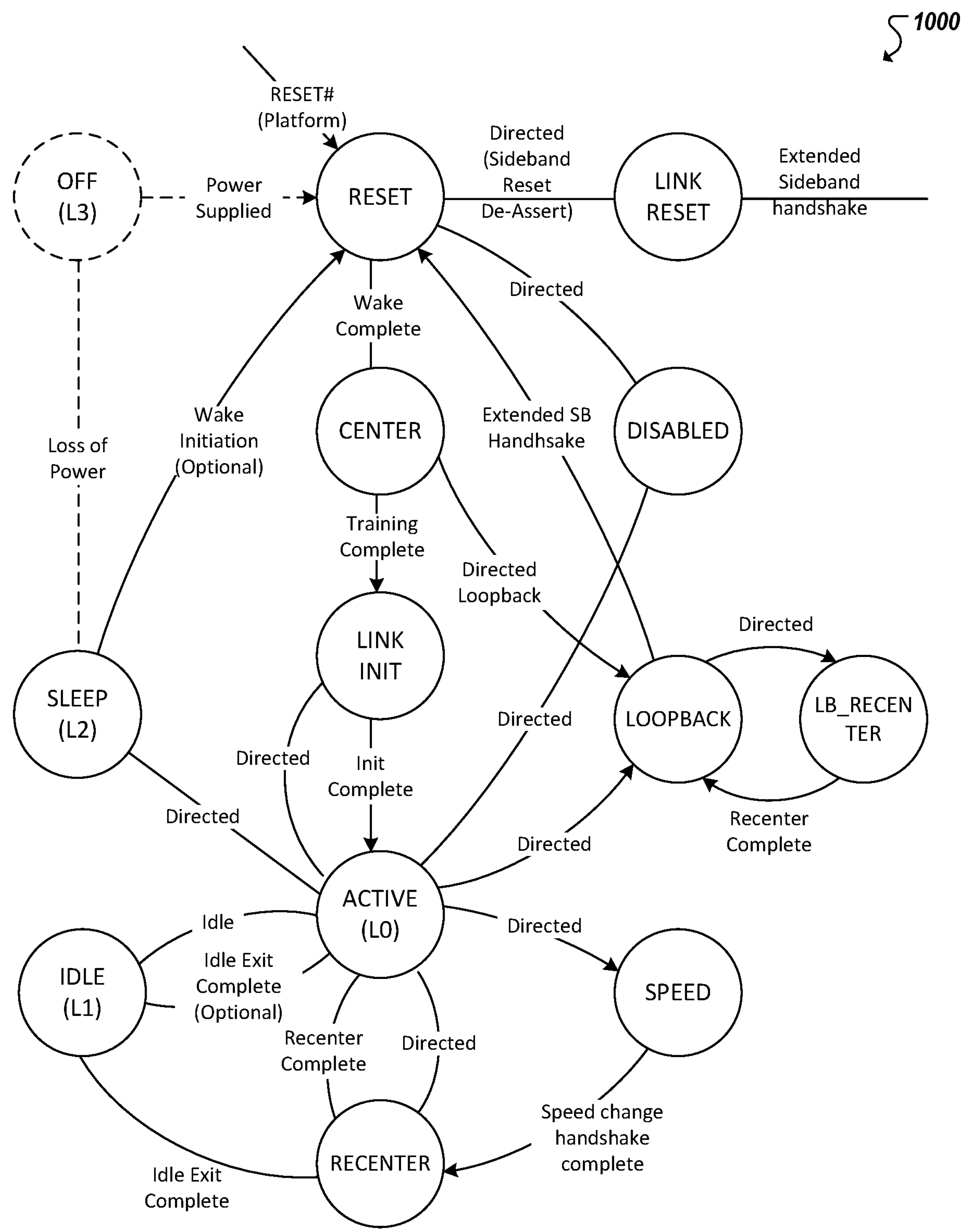
FIG. 10 is a representation of an example link state machine.

FIG. 10 is a more detailed link state machine diagram 1000, illustrating at least some of the additional link states and link state transitions that can be included in an example MCPL. In some implementations, an example link state machine can include, among the other states and state transitions illustrated in FIG. 10, a "Directed Loopback" transition can be provided to place the lanes of an MCPL into a digital loopback. For instance, the receiver lanes of an MCPL can be looped back to the transmitter lanes after the clock recovery circuits. An "LB_Recenter" state can also be provided in some instances, which can be used to align the data symbols. Additionally, as shown in FIG. 9, MCPL can support multiple link states, including an active L0 state and low power states, such as an L1 idle state, and L2 sleep state, among potentially other examples. As another example, configuration or centering states (e.g., CENTER) can be augmented or natively support reconfiguration of a link, while powered on, to allow lanes of the link to be reassigned to route data around one or more lanes of the link determined to be faulty, or marginal, among other examples.

Figure 11:
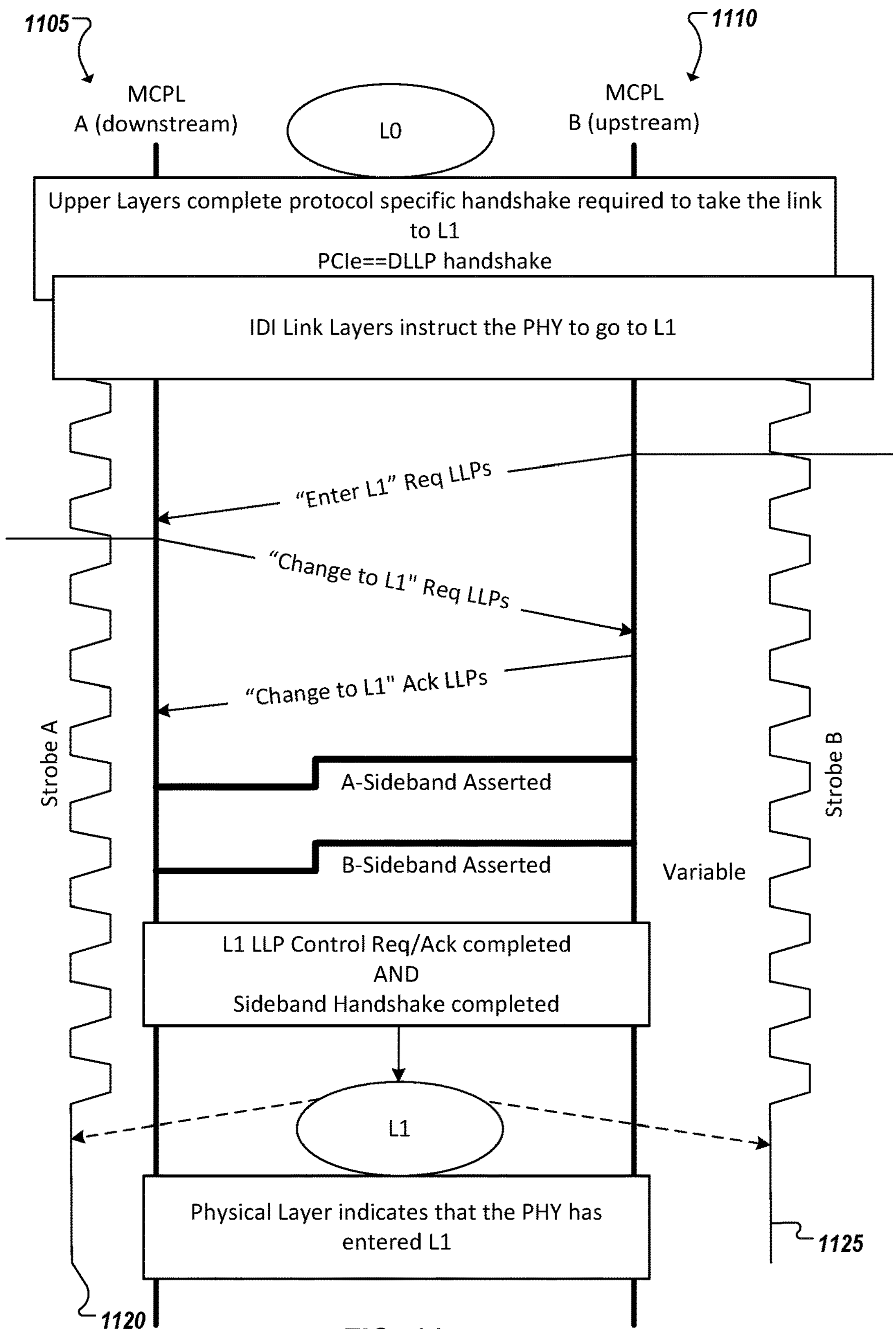
FIG. 11 is a representation of signaling to enter a low power state.

FIG. 11 is a simplified block diagram 1100 illustrating an example flow in a transition between an active state (e.g., L0) and a low-power, or idle, state (e.g., L1). In this particular example, a first device 1105 and a second device 1110 are communicatively coupled using an MCPL. While in the active state, data is transmitted over the lanes of the MCPL (e.g., DATA, VALID, STREAM, etc.). Link layer packets (LLPs) can be communicated over the lanes (e.g., data lanes, with the stream signal indicating that the data is LLP data), to assist in facilitating link state transitions. For instance, LLPs can be sent between the first and second devices 1105, 1110 to negotiate entry from L0 into L1. For instance, upper layer protocols supported by the MCPL can communicate that entry into L1 (or another state) is desired and the upper layer protocols can cause LLPs to be sent over the MCPL to facilitate a link layer handshake to cause the physical layer to enter L1. For instance, FIG. 11 shows at least a portion of LLPs sent including an "Enter L1" request LLP sent from the second (upstream) device 1110 to the first (downstream) device 1105. In some implementations, and upper level protocols, the downstream port does not initiate the entry into L1. The receiving first device 1105 can send a "Change to L1" request LLP in response, which the second device 1110 can acknowledge through a "Change to L1" acknowledgement (ACK) LLP, among other examples. Upon detecting completion of the handshake, the logical PHY can cause a sideband signal to be asserted on a dedicated sideband link to acknowledge that the ACK was received and that the device (e.g., 1105) is ready for and expecting entry into L1. For instance, the first device 1105 can assert a sideband signal 1115 sent to the second device 1110 to confirm receipt of the final ACK in the link layer handshake. Additionally, the second device 1110 can also assert a sideband signal in response to sideband signal 1115 to notify the first device 1105 of the first device's sideband ACK 1105. With the link layer control and sideband handshakes completed, the MCPL PHY can be transitioned into the L1 state causing all lanes of the MCPL to be put into idle power savings mode, including respective MCPL strobes of the 1120, 1125 of the devices 1105, 1110. The L1 can be exited upon upper level layer logic of one of the first and second devices 1105, 1110 requesting re-entry into L0, for instance, in response to detecting data to be sent to the other device over the MCPL.

As noted above, in some implementations, an MCPL can facilitate communication between two devices supporting potentially multiple different protocols, and the MCPL can facilitate communications according to potentially any one of the multiple protocols over the lanes of the MCPL. Facilitating multiple protocols, however, can complicate entry and reentry into at least some link states. For instance, while some traditional interconnects have a single upper layer protocol assuming the role of master in state transitions, an implementation of MCPL with multiple different protocols effectively involves multiple masters. As an example, as shown in FIG. 11, each of PCIe and IDI can be supported between two devices 1105, 1110 over an implementation of an MCPL. For instance, placing the physical layer into an idle or low power state may be conditioned on permission first being obtained from each of the supported protocols (e.g., both PCIe and IDI).

In some instances, entry into L1 (or another state) may be requested by only one of the multiple, supported protocols supported for an implementation of an MCPL. While there may be a likelihood that the other protocols will likewise request entry into the same state (e.g., based on identifying similar conditions (e.g., little or no traffic) on the MCPL), the logical PHY can wait until permission or instructions are received from each upper layer protocol before actually facilitating the state transition. The logical PHY can track which upper layer protocols have requested the state change (e.g., performed a corresponding handshake) and trigger the state transition upon identifying that each of the protocols have requested the particular state change, such as a transition from L0 to L1 or another transition that would affect or interfere with other protocols' communications. In some implementations, protocols can be blind as to their at least partial dependence on other protocols in the system. Further, in some instances, a protocol may expect a response (e.g., from the PHY) to a request to enter a particular state, such as a confirmation or rejection of the requested state transition. Accordingly, in such instances, while waiting for permission from other supported protocols for entry into an idle link state, the logical PHY can generate synthetic responses to a request to enter the idle state to "trick" the requesting upper layer protocol into believing that a particular state has been entered (when, in reality, the lanes are still active, at least until the other protocols also request entry into the idle state). Among other potential advantages, this can simplify coordinating entry into the low power state between multiple protocols, among other examples.

Implementations of a logical PHY can include error detection, error reporting, and error handling logic. In some implementations, a logical PHY of an example MCPL can include logic to detect PHY layer de-framing errors (e.g., on the valid and stream lanes), sideband errors (e.g., relating to LSM state transitions), errors in LLPs (e.g., that are critical to LSM state transitions), among other examples. Some error detection/resolution can be delegated to upper layer logic, such as PCIe logic adapted to detect PCIe-specific errors, or to system management software, among other examples. In some implementations, error detection and handling mechanisms can be provided, such as cyclic redundancy check (CRC), retry buffers, among other potential examples, to assist in bit error detection on an MCPL. Further, error detection logic, whether implemented in management software or the logic PHY, can determine that specific lanes are faulty, or marginal, based on determining lane-specific bit errors on a link.

An MCPL port can consists of a large number of lanes (e.g., 100 lanes or more) operating at very high speeds (e.g., 8 Gbs). For instance, an MCPL port can include 80 or more lanes in each direction (e.g., 160+ total lanes). In some instances, an MCPL link or port can progress to an Active state (L0) even when some of the lanes of the link or port are faulty, or "marginal". This can take place as centering is completed once and for a limited time in a controlled noise and crosstalk environment. Lanes may also become marginal over time, for instance, due to self-heating, electromigration, aging, package imperfections, and other causes. Marginal lanes can lead to the entire link failing. As a result, it is desirable to identify lanes that have become marginal and to do so before failure of the link occurs. Identification of a marginal lane can allow corrective action to be taken, such as reconfiguration of the link. In some cases, discovery and correction of marginal lanes can be performed dynamically, without powering down the link and corresponding systems. This can be beneficial, for instance, in systems where constant operation is desired, such as in server systems requiring 24×7 operation. Identifying stressed lanes can also be helpful for tuning the centering algorithms for process or package changes and improving manufacturing tests.

Monitoring the analog quality of even a single operating lane can be difficult at high speed. One conventional solution has been to provide an analog viewpin to allow test equipment access to a problem lane. However, in a system with large numbers of lanes (e.g., 100+ lanes), this approach can be unsatisfactory. Further, identifying a specific one of the large number of lanes can be difficult. Additionally, even if the specific marginal lane can be identified, dynamically reconfiguring the link to account for the marginal lane can be expensive and disruptive. For instance, while QPI links possesses functionality for identifying hard faults after they have occurred and reconfigure around a bad lane, such conventional solutions result in reduced bandwidth and other issues.

In one implementation, MCPL logic can be provided that includes the capability of identifying specific marginal lanes and taking action, autonomously, to replace the marginal lane before a hard fault results without bringing the system down. Packets sent on a high speed link can be protected by checksum, parity, and other values that allow bit errors in the packet to be detected. In one example, at least some of the protocols sent on an MCPL link can be protected with by a CRC. For CRC, a particular corresponding packet is treated as a Galois Field polynomial (e.g., GF(2)), which is divided by the CRC polynomial. The remainder, or checksum, can then be appended to the packet before transmit. At the receiving end, the receiver can attempt to perform the same calculation. If no bit errors are present in the packet, the same operation will always yield a fixed remainder (or syndrome). Bits in error, however, would cause the syndrome to be different from the fixed one.

In one particular example, a common CRC can be used in each of the types of data sent over an MCPL. For instance, a 16-bit CRC polynomial can be added to each of the flits, packets, or other data (of varying protocols) sent over an MCPL. In one example, the CRC polynomial can be selected such that a CRC syndrome generated from the CRC can be used to identify specific bit errors, which can then be mapped to specific lanes of a link. In one example, syndrome properties of a 0x1f053 16-bit polynomial calculation can be used to identify bad lanes. Such a CRC polynomial can possess capabilities that allow all 1, 2, 3 bit errors and almost all 4 bit errors on an MCPL flit to be identified.

Figure 12:
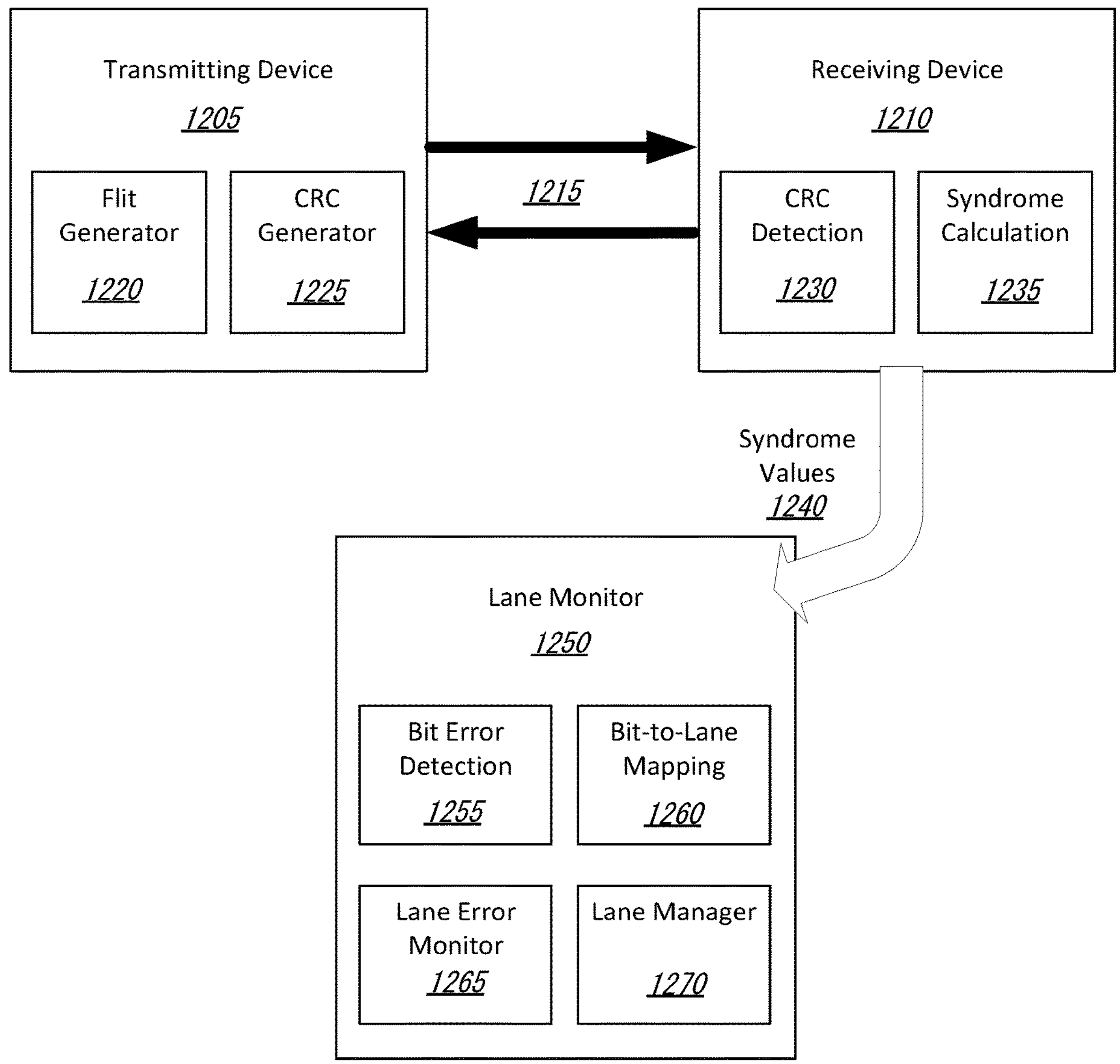
FIG. 12 is a block diagram illustrating an example implementation of an MCPL.

Turning to FIG. 12, a simplified block diagram 1200 is shown representing components implemented in hardware and/or software that can be provided, in some instances, to identify problem lanes from CRC syndrome values identified during CRC error calculations. For example, a first device 1205 can be coupled to a second device 1210 over an MCPL 1215. The first device 1205, in this example, can be a transmitting device in a particular transaction (or instance) and send data to the second, receiving device 1210 over the MCPL 1215. (It should be appreciated that in other instances, device 1210 can send data as the transmitting device over a MCPL to device 1205, among other examples.) The first device 1205 can include logic 1220 to generate one or more flits for transmission across the MCPL 1215. A packet, message, or other formulation of data to be sent over the MCPL can comprise one or more flits. Each flit can include a CRC value calculated and encoded using a CRC generator 1225. The flits can be sent over the link 1215 to the second receiving device 1210. The second device 1210 can include logic to receive the flit and decode, or otherwise identify, the flit, including header values, slot values, and the CRC value (e.g., using CRC checking logic 1230).

A receiving device can utilize a CRC value in a received flit to identify bit errors in the flit. In some implementations, the receiving device can regenerate the CRC from the remaining bits of the received flits and compare the regenerated CRC value with the received CRC value (e.g., using CRC checking logic 1230) to determine bit errors. An error checksum (or residue or "syndrome") can be generated (e.g., using CRC checking logic 1230) during the comparison in response to an error in the flit (and a mismatch between the regenerated CRC value and received CRC value). In some cases, a syndrome can be generated during regeneration of the CRC on the payload portion of the flit at the receiving device and the regenerated CRC can be compared against the received CRC value, for instance, through a bit-wise XOR comparison, with the value resulting from the comparison embodying the syndrome. In another example, a CRC can be performed at the receiving device on the entire flit (i.e., including the received CRC field), with the result of this operation embodying the syndrome. The syndrome can be generated at the receiver using hardware or firmware, or alternatively, the syndrome can be generated by software, such as software supervising operation of the receiver and link, among other potential implementations. In one specific implementation, a 16-bit syndrome value can be generated when errors are detected from a 16-bit CRC value. Other implementations can use other error residue values.

A syndrome value (e.g., 1240) determined by the receiving device (e.g., by CRC checking logic 1230) can be communicated or otherwise made available to a lane monitor module 1250, implemented in hardware and/or software (or even at one of the first and second devices 1205, 1210). The lane monitor 1250 can include a bit error detection module 1255 that includes logic to map a syndrome value to a particular bit (or multiple bits) in the flit. A CRC value can be generated from a CRC polynomial that is adapted to the flit's organization such that a unique syndrome value results from any given one of a set of errors (such as a set that includes any single bit error on any one of the bits of the flit, any single two bit error affecting any two consecutive bits of the flit, etc.). Accordingly, the bit error detection module 1255 can determine, from the syndrome 1240 one or more specific bits of the flit where the bit error occurred. The bit error detection module can also determine, from the syndrome, the type of error, such as a single bit error, two-bit error, etc.

In some instances, the bits of a flit can be transmitted in the same respective lane in multiple different flits. Accordingly, a mapping can be maintained and determined (e.g., using bit-to-lane mapping module 1260) to map an error affecting a given bit to its respective lane of the link. In other cases, such as when the flit is transmitted during a partial width link state or during lane reversal conditions, mapping the detected bit affected by an error to the lane on which it was transmitted can be more involved. In some implementations, the lane error monitor 1250 can receive additional data from the receiving device 1210 (and/or transmitting device 1205) or from other resources (e.g., registers corresponding to the link) that indicate the conditions of the corresponding lane when the flit was sent. Such additional information can include, for example, a physical layer flit swizzling phase number, physical layer link width indicator, an indicator showing whether lane reversal is used or not, etc. Using such information, the bit-to-lane mapping module 1260 can determine the lanes used in the sending of a particular flit and thereby determine the bit ordering used during the transmission to determine the specific lane on which each flit bit was sent. In this manner, the bit-to-lane mapping module 1260 can determine from the syndrome, for at least some bit errors, the lane on which the bit error occurred. The bit-to-lane mapping module 1260 can record or report this information for a lane error monitor 1265. The lane error monitor 1265 can maintain records, a counter, or some other data that indicate, for each lane of a given link (e.g., 1215) the number and frequency of errors detected on the lane (e.g., based on the reported link errors determined using bit error detection 1255 and bit-to-lane mapping module 1260.

In one example, lane error monitor 1250 can maintain one or more tables to record bit errors determined on a lane-by-lane basis. A probabilistic decision algorithm can be utilized by the lane error monitor 1265 to determine that a statistically significant number of bit errors are being detected on a given lane of a link during a period of time. The statistically significant value can be a threshold amount of errors determined over the period, can be a rate of errors exceeding a defined threshold error rate for the lane, among other examples. The algorithm can also take into account the amount of time the lane has been active (e.g., in an L0 state or remaining active during a partial width state, etc.), the number of bits that have been sent, among other factors in determining when errors are the lane exceed a threshold or other acceptable value. Based on identifying a statistically significant amount of bit errors appearing on a given lane, a lane error monitor 1265 can determine that the lane is a marginal or faulty lane and do so before the issues with this lane cause a fault in the MCPL as a whole.

Upon determining that one or more lanes of a link are experiencing problems, based on statistically significant numbers of bit errors determined for the lane from syndrome values 1240 and/or checksum comparison values 1280, a lane manager 1270 can be invoked to perform actions on the lane(s) or instruct one or both of the devices 1205, 1210 to enter a reconfiguration state to correct the issue. For instance, a lane determined to be "bad" can cause the MCPL to be recentered and reconfigured to drop the bad lane and reassign logical lanes to different physical lanes of the link.

FIGS. 13A-13C illustrate representations of example bit mappings on data lanes of an example MCPL for various types of data. For instance, an example MCPL can include fifty data lanes. Some forms of traffic sent on the MCPL may use less than the entire number of lanes provided. FIG. 13A illustrates a first bit mapping of example 16 byte slots in a first protocol, such as IDI, that can be sent over the data lanes within an 8 UI symbol, or window. For instance, within the defined 8 UI window, three 16 byte slots, including a header slot, can be sent. Two bytes of data remain, in this example, that can be sent on a fifty lane link and these remaining two bytes can be utilized for CRC bits (e.g., in lanes DATA[0] and DATA[1]), 16-bit 0x1f053 CRC polynomial value, such as discussed above.

In another example, FIG. 13B illustrates a second example bit mapping for PCIe packet data sent over the fifty data lanes of an example MCPL. In the example of FIG. 13B, 16 bytes packets (e.g., transaction layer (TLP) or data link layer (DLLP) PCIe packets) can be sent over the MCPL. Framing tokens can be included in these symbols and used to locate the start and end of each packet. In one example of PCIe, the framing utilized in the example of FIG. 13B can be the same as those token implemented for PCIe at 8 GT/s. In an 8 UI window, three PCIe packets (e.g., data link layer packets (DLLPs) or transaction layer packets (TLPs)) can be sent, with the remaining two bytes of bandwidth left unused within the window. As in the example of FIG. 13A, these two remaining bytes can be utilized for the same 16-bit 0x1f053 CRC polynomial used in other protocols (e.g., IDI), that allow bit-wise identification of bit errors using the CRC syndrome.

In yet another example, illustrated in FIG. 13C, an example bit mapping of link-to-link packets (e.g., LLP packets) sent over an example MCPL is shown. LLPs can be 4 bytes each and each LLP (e.g., LLP0, LLP1, LLP2, etc.) can be sent four consecutive times, in accordance with fault tolerance and error detection within an example implementation. For instance, failure to receive four consecutive identical LLPs can indicate an error. Additionally, as with other data types, failure to receive a VALID in a proceeding time window, or symbol, can also indicate an error. In some instances, LLPs can have fixed slots. Additionally, in this example, unused, or "spare," bits in the byte time period, can result in logical 0s being transmitted over remaining lanes. These free lanes can be augmented to allow the transmission of the 16-bit 0x1f053 CRC polynomial, allowing bit errors to be detected in the LLP packets as well, among other examples. Other example data types, or stream types, can be supported beyond these examples. Additionally, alternative bit-mappings can be adopted for these and other data types and can be used in the identification of bit errors on a lane-by-lane basis. As an example, while some of the examples map bits "right-to-left" beginning with the least significant numbered-lane (e.g., of a cluster), other implementations (including other links within the same system) may map lanes from the most significant numbered-lane (or "left-to-right"), among other examples.

In accordance with the above, on flit errors, the current flit mapping can be saved or otherwise made identifiable to bit-to-lane mapping logic. This state can be saved along with the syndrome to allow software (e.g., bit-to-lane mapping logic) to decode the lane location of the error. A set of possible flit mappings can be defined for use on a link.

Turning to FIG. 14-1, 14-2, 14-3, a representation is shown of a mapping of syndrome values calculated from CRC values resulting from single bit errors in a flit. Such a mapping can be implemented in a syndrome decoder table that can be used to decode the lane on which a given bit error occurred. For instance, the mapping represented in FIG. 14-1, 14-2, 14-3 illustrate the mapping for single bit error in a 400 bit (or smaller) flit. It should be appreciated that the representation FIG. 14-1, 14-2, 14-3, can in some implementations, merely represent a portion of the mapping, with additional unique CRC syndrome values generated to map syndromes to single bit errors in flits and packets larger than 400 bits. For instance, the use of the CRC can be extended to generate unique syndrome values for packets, flits, or data packages of over 400 bits, such as for a 1-byte window of data sent over fifty lanes of an MCPL.

A CRC polynomial can be selected such that a unique syndrome value can exist for each possible single bit error in the flit, as illustrated in FIG. 14-1, 14-2, 14-3. As an example, a syndrome value of 0xcc48 can always result, in this implementation, when a single bit error affects bit 50 of the flit. As another illustration, a syndrome value, in this example implementation, of 0xb8d3 can always result when a single bit error affects bit 229 of the flit, and so on. Achieving such a mapping can be accomplished by determining and using a particular CRC polynomial adapted to generate such unique values for the particular the flit layout (and phit formats). For instance, in the example of FIGS. 14-1 and 14-2, the CRC polynomial 0x1f053 can be selected to generate a 16-bit CRC that enables bit-specific error detection. Multiple other CRC polynomials may also exist for a given flit format that allows for unique single-bit CRC syndrome values for each single bit error in the flit. Software can be used to test combination of bit errors that might emerge for a given flit format and further determine, for a series of different candidate CRC polynomials, which polynomials resulted in CRC syndrome values that were unique for each different bit error.

Turning to FIGS. 15-1, 15-2, and 15-3, a second syndrome decoder table 1500 is shown that corresponds to an example 400-bit flit and corresponding CRC generated from an example CRC polynomial (e.g., 0x1f053). Syndrome decoder table 1500, rather than mapping to single bit errors, maps syndromes to the complete set of two-bit errors (i.e., consecutive bit errors) that might appear in a set of 400 consecutive bits. Accordingly, in some implementations, a CRC polynomial can be selected and used that results in unique CRC syndrome values not only for each possible single bit error on a flit, but also for all possible two-bit errors, among other examples. As an example, a syndrome value of 0x1c93 can always result, in this implementation, when a double bit error affects the combination of bits 228 and 229 of the flit. As another illustration, a syndrome value, in this example implementation, of 0xae58 can always result when a double bit error affects bits 99 and 100 of the flit, and so on. Naturally, it should be appreciated that the examples shown in FIGS. 14-1, 14-2, 14-3, 15-1, 15-2, 15-3 are specific to an example implementation that is to provide a 16-bit CRC value for a flit of any one the plurality of protocols that can be sent over an MCPL. These same principles, however, can be applied to other interconnect link technologies. Further, it should be appreciated that some CRC polynomials may result in unique detection of other bit-specific errors in addition to (or as an alternative to) single-bit and two-bit errors and other examples.

A mapping of bit errors to one or more flit bits, such as implemented through a syndrome decoder table, can be used to map the bit errors to one or more respective lanes used to send the corresponding flit affected by the bit error(s). For instance, a syndrome can be received (e.g., from a particular device involved) in a corresponding transaction in which a corresponding bit error was determined from the CRC value of a flit of the transaction. A lane monitor can determine whether the syndrome value is included in one of a set of syndrome decoder tables (e.g., 1400, 1500). If it is, the proper syndrome decoder table can be used to identify the bit number within the flit that is in error (as well as if multiple bits were in error). If the syndrome is not included in an available syndrome decoder table, the error may not be able to be mapped to particular bits or lanes (e.g., in instances where multiple, non-contiguous bit errors affect the flit). In cases where a table is identified that includes the syndrome value, one or more specific bits can be identified as affected by the error and a bit-to-lane mapping can then be determined for the identified bit(s) that are in error to determine that the bit in error was sent on a given one of a plurality of lanes on a link of an interconnect. The lane number can be decoded, for instance, by first determining the type of the data in which the error was detected (e.g., from the corresponding stream ID). A respective bit-to-lane mapping (e.g., FIGS. 13A-13C) corresponding to the data type can be determined and used. Further, the bit-to-lane mapping used can also be affected by determining whether any lanes have been (previously) retired on a port (e.g., due to the lane being marginal), the manner in which lanes are assigned within a cluster of lanes, which lanes of the corresponding cluster are idle, whether (and which) swizzling phase was applied, and whether lane reversal was applied, among other example factors and considerations.

Turning to FIG. 16, a simplified block diagram 1600 is shown representing at least a portion of a system including an example implementation of an MCPL, including clusters 1605-1615 of data lanes used to implement the MCPL. The system can include MCPL logical PHY 630 and MCPL physical PHY 625. Clusters of lanes, such as common cluster 1620 and phase-lock loop (PLL) cluster 1625 can be used to provide lanes for clocking and control, such as lanes used for the sideband, stream, strobe, and valid lanes of an MCPL, among other lanes. In one example, the control lane clusters 1605 can include one or more idle, or unused, lanes. These lanes can be used in the event one or more of the control lanes becomes marginal, with the marginal control lane being reassigned to one of the unused lanes. Similarly, each one of the clusters of data lanes 1605-1615 can be provided with a defined number of lanes. In some implementations, lanes can be assigned to a given MCPL on a cluster basis. For instance, in one example, each cluster of data lanes can include twenty physical lanes. If the MCPL is to include fifty lanes, three twenty lane clusters can be assigned to the MCPL to provide fifty (or, in reality, sixty) lanes. As less than all of the assigned clusters will be assigned for use in the MCPL, extra unused lanes (e.g., 10 lanes) can be used in case one of the assigned lanes becomes marginal.

As noted above, a CRC syndrome can be included in each flit of data sent on an MCPL, regardless of data (or stream) type. Using the syndrome, individual bit errors can be identified and mapped to corresponding physical lanes assigned for use in the MCPL. After a threshold or statically significant amount of bit errors are identified for a particular physical lane, the logical PHY, a software management system, or other logic can determine that the particular lane is marginal. To avoid a system fault caused by this marginal lane, the MCPL can be reconfigured without bringing down the system. In one example, the logical assignment of lanes can be shifted away from the marginal lane toward a block of unused lanes in a data lane cluster used in the MCPL. This reconfiguration of the lanes can cause a re-routing of the lanes used in the MCPL and can include causing the MCPL to enter a link state that allows for the reconfiguring.

In one example, a modified re-centering link state and process can be enabled and a sideband lane can be used to communicate with the transmitting and receiving devices to orchestrate the reconfiguration. For instance, the software- or hardware-based lane manager can use the MCPL sideband to direct the remote transmitter to reconfigure the link to cause traffic of each lane to the left (or right) of the marginal lane to be rerouted its adjacent away from the marginal lane. The unused lane adopted by the reconfigured MCPL may be ready for data transmission as it has participated in the original centering performed during MCPL initialization (e.g., carrying a scrambled "0" value during the L0 state), allowing data to be immediately sent on the unused lane following reconfiguration. This can allow reconfiguration to forego recentering using a PRBS, among other efficiencies. In other instances, unused lanes can be kept idle during the L0 data transmitting state to save power. In these instances, a reconfiguration can be performed (again, without bringing down the link) but with a PRBS used in both the reconfiguration and recentering states.

Reconfiguring a link to account for an identified marginal lane by re-routing a portion of the lanes to adjacent lanes (and one unused lane) can minimize the overall routing impact. A lane multiplexer of the transmitting and/or receiving devices rerouting can perform the rerouting. In some implementations, the lane multiplexer can be implemented in software or the logical PHY 630, while in other implementation the lane multiplexer can be implemented in hardware of the physical PHY 625. In some examples, the lane multiplexer can be merged into other multiplexers, such as loopback slave and lane reversal multiplexers in the logical PHY 630. In some instances, lane multiplexer can be advantageously implemented in software or the logical PHY 630 to avoid complications arising from other circuits, as well as control lane clusters (e.g., common cluster) at some data lanes cluster boundaries, among other example considerations.

Figure 17A:
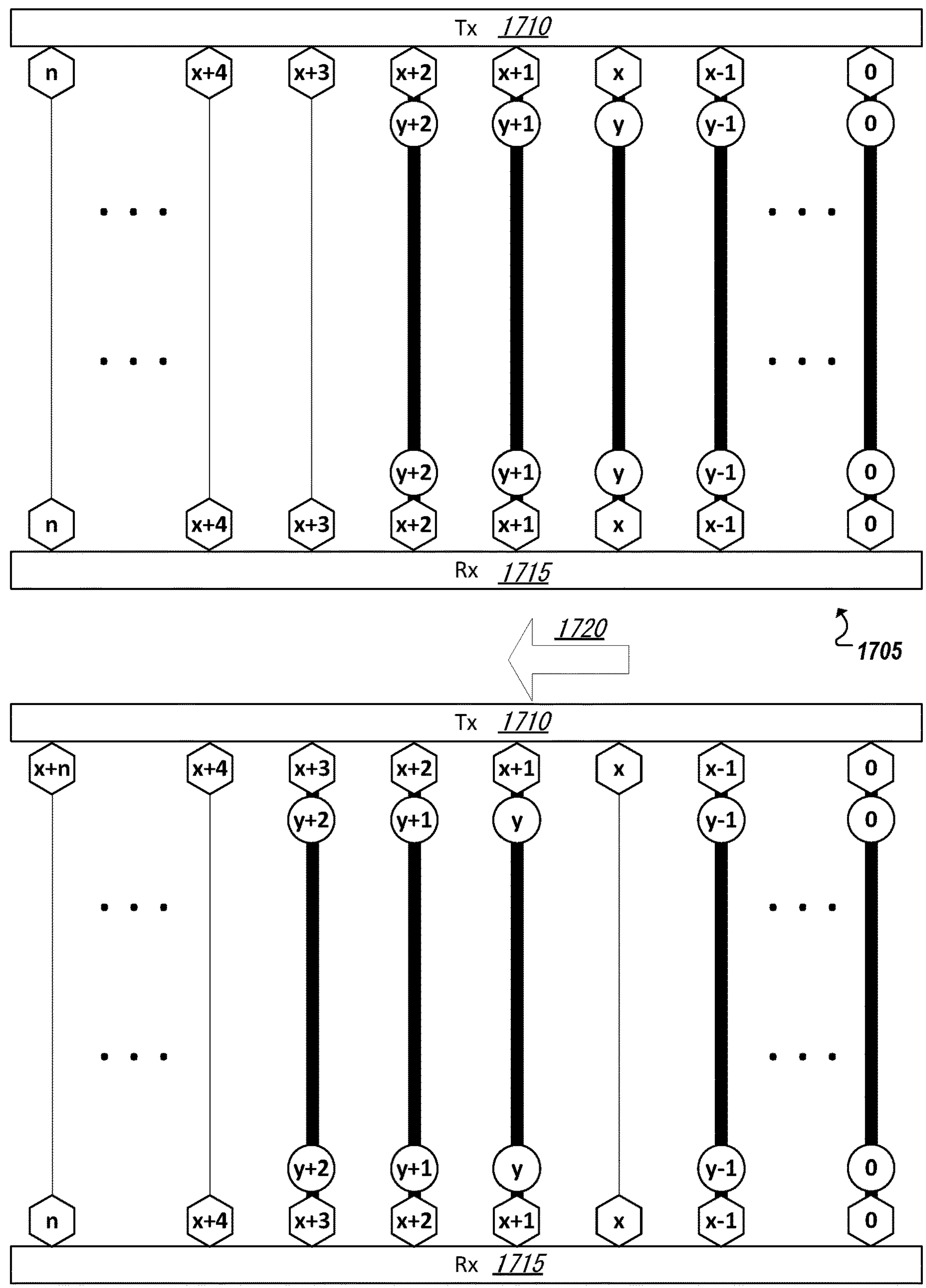
FIGS. 17A-17B are diagrams illustrating examples of link reconfiguration in accordance with at least some embodiments.
Figure 17B:
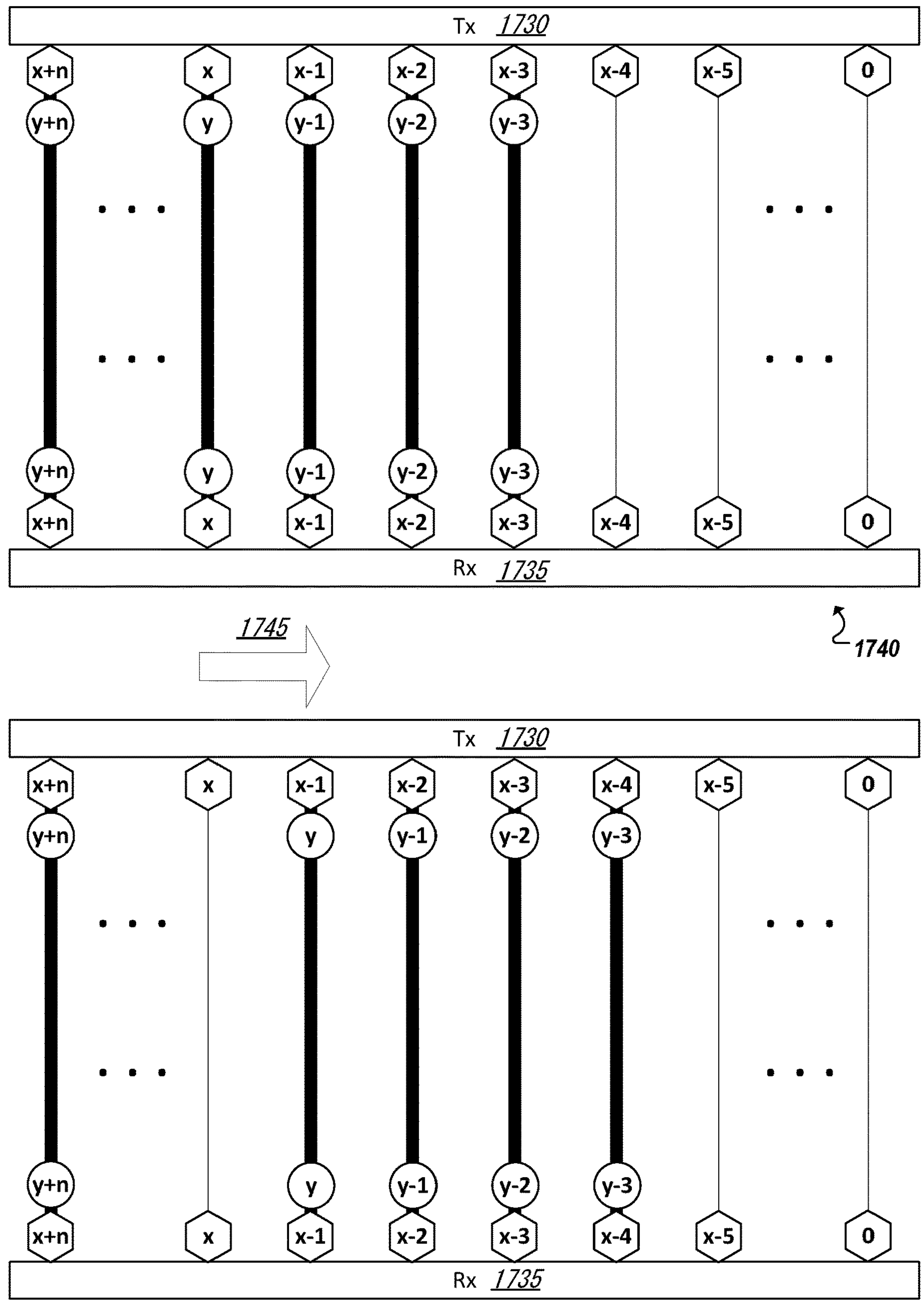

Turning to FIGS. 17A-B, example implementations of a reconfiguration of a link are illustrated. For instance, in FIG. 17A, a cluster of n lanes is illustrated. In this example, y+2 total lanes in the cluster are assigned following configuration of the MCPL (at 1705). Accordingly, following the initial configuration, (logical) lanes numbered 0 through y+2 are assigned to physical lanes 0 through x+2. In this example, empty lanes in the MCPL are positioned on the most-significant lanes of one of the clusters used to form the MCPL, in this case, lanes x+3 through n. Continuing with this example, lane x can be determined to be marginal, for instance, based on the detection of repeated bit errors mapped to the lane using a CRC syndrome, such as described above. To address the marginal lane x, both devices (e.g., 1710, 1715) on the link can enter a reconfiguration (and/or recentering) state and re-route traffic on a portion of the assigned lanes to decommission the marginal lane x and replace it with one of the unused lanes. For instance, as the empty lanes "follow" the active lanes (and marginal lane x), reconfiguration can cause the lane assignments "following" the marginal lane to shift 1720 over to an adjacent physical lane in the direction of the open lanes (as shown in 1725). Accordingly, the most significant assigned lane number y+2 can shift to previously unused physical lane x+3, y+1 can shift to x+2, and lane number y, originally assigned to marginal lane x, can shift to physical lane x+1. Marginal lane x, following the shift 1720, can be left unused. In some cases, this reconfiguration change can be permanent, with lane x considered permanently marginal and unusable.

FIG. 17B illustrates another example of a reconfiguration of an MCPL connecting devices 1730, 1735. In this example, lane numbers 0 through y+n are originally assigned (at 1740) to physical lanes x−3 through n. Extra unused physical lanes are also present in this example, such as lanes 0 through x−4. In this example, rather than occupying the most significant physical lanes of the link, unused lanes occupy the least significant physical lanes of the link (e.g., lanes 0 through x−4). Again, in this example, physical lane x is determined to be marginal, triggering reconfiguration of the link. However, given that the empty lanes "preceed" the marginal lane x in this example, all lanes "preceeding" the marginal lane are shifted 1745 in the direction opposite the shift in FIG. 17A, again toward the unused lanes. For instance, lane number y is shifted from the marginal lane x to lane x−1, lane number y−1 is shifted from physical lane x−1 to x−2, lane number y−3 is shifted from lane x−3 to previously unused lane x−4, and so on (as shown at 1750). Accordingly, in determining how to shift and reassign lanes in a reconfiguration step, logic can identify the location of unused lanes in the lane cluster(s) used to implement the data lanes of the link (e.g., MCPL), and can shift lanes from the marginal lane toward the empty lanes, as in the examples of FIGS. 17A-17B.

For instance, when one of the active data lanes i included in one of the assigned clusters. Other instances may define an MCPL or data lane cluster with a different number of lanes, with corresponding numbers of clusters being assigned to a single MCPL, and a different number of unused lanes remaining from in one of the assigned clusters. Regardless of the implementation, unused data lanes remaining in an assigned cluster can be reserved to reassign another data lane determined to be marginal.

FIGS. 18A-18B show flowcharts 1800*a-b* illustrating example techniques for detecting and remedying marginal lanes on an interconnect link, such as MCPL. For instance, as shown in FIG. 18A, a flit can be received 1805 with an error code, such as a CRC, embedded 1805 in, or sent together with the flit of data on a link. Alternatively, errors can be detected through other mechanisms, such as by checking parity on the lane, among other examples. The link can time multiplex the sending of data of multiple different types (or protocols) using the same link. The error code can be used (e.g., by the receiving device) to detect 1810 one or more bit errors. For instance, the error code can enable the generation of a corresponding syndrome, which can indicate which bits of the flit were in error. The specific bit errors can be mapped 1815 to the particular lane of the link used to send the erroneous bit. Mapping of bit errors to lanes can be based on which protocol applied to the flit, with different protocols potentially mapping bits to lanes differently. The detected bit error can be associated 1820 with the particular lane and can be used to detect lanes that are marginal (e.g., based on a higher than average number of bit errors appearing on the particular lane).

Turning to FIG. 18B, a particular lane can be determined 1830 to be marginal. The determination 1830 can be based, for instance, on the detection of multiple bit errors appearing on the particular lane according to the technique described in the example of FIG. 18A. Determining 1830 that a lane is marginal can prompt reconfiguration of the link to reassign data to at least one empty, or unused, lane to decommission the marginal lane. This can be accomplished, for instance, by identifying 1835 an empty lane in a cluster of lanes used to form the link. A set of contiguous lanes may exist between the marginal lane and the empty lane. In some cases, the empty lane can be the first of a span of empty lanes in the cluster. Reconfiguration 1840 and reassignment of the lanes can involve shifting the assignment of each lane in the set, including the marginal lane, toward the empty and away from the marginal physical lane. Thus, data for each lane in the set, following reconfiguration 1840, is to be sent on the physical lane adjacent to its originally assigned physical lane (in the direction of the empty lanes). One of the empty lanes is adopted as an assigned lane in the link by virtue of the shift and the marginal lane is left unassigned. Lanes of the link not included in the set remain as originally assigned. This reconfiguration 1840 can take place while the system is live, for instance, by transitioning to a reconfiguration link state, such as a centering state, and data transmission can be automatically resumed 1845 on the newly assigned lanes following the reconfiguration 1840.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 19:
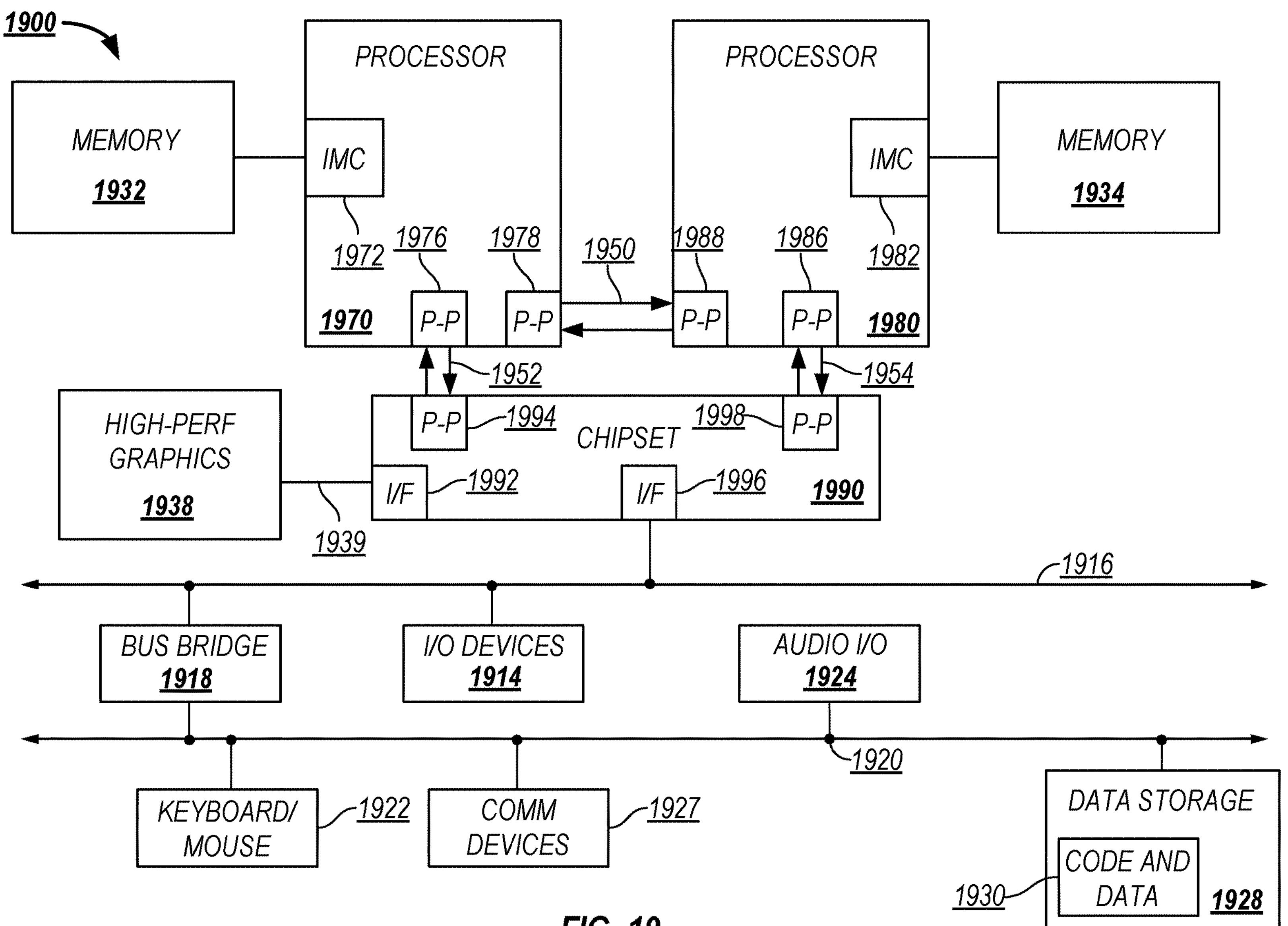
FIG. 19 illustrates an embodiment of a block for a computing system including multiple processors.

Referring now to FIG. 19, an example implementation of a system 1900 is shown in accordance with an example embodiment. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of a processor. In one embodiment, 1952 and 1954 are part of a serial, point-to-point coherent interconnect fabric, such as a high-performance architecture. As a result, the invention may be implemented within the QPI architecture.

While shown with only two processors 1970, 1980, it is to be understood that the scope of the present invention is not so limited. In other embodiments, one or more additional processors may be present in a given processor.

Processors 1970 and 1980 are shown including integrated memory controller units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 each exchange information with a chipset 1990 via individual P-P interfaces 1952, 1954 using point to point interface circuits 1976, 1994, 1986, 1998. Chipset 1990 also exchanges information with a high-performance graphics circuit 1938 via an interface circuit 1992 along a high-performance graphics interconnect 1939.

A shared cache (not shown) may be included in either processor or outside of both processors; yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 are coupled to first bus 1916, along with a bus bridge 1918 which couples first bus 1916 to a second bus 1920. In one embodiment, second bus 1920 includes a low pin count (LPC) bus. Various devices are coupled to second bus 1920 including, for example, a keyboard and/or mouse 1922, communication devices 1927 and a storage unit 1928 such as a disk drive or other mass storage device which often includes instructions/code and data 1930, in one embodiment. Further, an audio I/O 1924 is shown coupled to second bus 1920. Note that other architectures are possible, where the included components and interconnect architectures vary. For example, instead of the point-to-point architecture of FIG. 19, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and/or a method to receive first data on a plurality of data lanes of a physical link, receive a stream signal corresponding to the first data on a stream lane identifying a type of the first data, identify a first instance of an error detection code of a particular type in the first data, receive second data on at least a portion of the plurality of data lanes, receive a stream signal corresponding to the second data on the stream lane identifying a type of the second data, and identify a second instance of the error detection code of the particular type in the second data. The stream lane is another one of the lanes of the physical link and, in some instance, the type of the second data is different from the type of the first data.

In one example, the error detection code of the particular type is a cyclic redundancy check (CRC) code.

In one example, the CRC code in the first data and the CRC code in the first data are based on a common CRC polynomial.

In one example, the error detection code is sent on one or more particular lanes of the plurality of lanes in the first data and the error detection code is sent on one or more other lanes of the plurality of lanes in the second data.

In one example, fewer of the plurality of lanes are used to send the second data than the first data.

In one example, lane error detection logic is provided (in hardware circuitry and/or software) to determine from a syndrome associated with the error detection code corresponding to the first data, that a bit error is present in the first data, determine from the syndrome which bit in the first data was in error, and map the bit in error to a particular one of the plurality of lanes.

In one example, the bit error is to be associated with the particular lane.

In one example, the syndrome is generated from the error detection code corresponding to the first data.

In one example, mapping the bit in error to a particular one of the plurality of lanes is based on the type of the first data.

In one example, a particular one of the plurality of lanes is identified as marginal and at least one of the plurality of lanes is unused. The link can be reconfigured to discontinue routing data on the particular lane and replace the particular lane with the at least one unused lane.

In one example, reconfiguring the link includes rerouting a group of lanes in the plurality of lanes to shift each lane in the group to an adjacent lane away from the particular lane and toward the at least one unused lane.

In one example, each data type corresponds to a respective one of a plurality of different communication protocols.

In one example, physical layer logic is to receive a valid signal in association with at least the first data to indicate that the first data is valid.

In one example, the physical layer logic is further to define a data window for data to be sent on the data lanes, and the data window corresponds to the valid signal.

One or more embodiments may provide an apparatus, a system, a machine readable storage, a machine readable medium, and/or a method to determine a first error correction code for first data to be sent on a plurality of data lanes of a physical link, send the first data with the first error correction code on the plurality of data lanes, determine a second error correction code for the second data to be sent on at least a portion of the data lanes of the physical link, and send the second data with the second error correction code on at least the portion of the data lanes. The first and second data can be data of different types or protocols. The first error correction code and the second error correction code can each be instances of a same error correction code type.

In one example, the error correction code type includes a cyclic redundancy check (CRC) code, and the first error correction code and the second error correction code are each instances of a CRC generated from a particular CRC polynomial.

In one example, where the particular CRC polynomial is configured to allow generation of syndromes from CRC codes calculated according to the particular CRC polynomial, and the syndromes each correspond to a respective bit error on a specific corresponding bit in a flit.

One or more embodiments may provide an apparatus, a system, a machine readable storage, a machine readable medium, and/or a method to identify that a particular one of a plurality of lanes of a link is marginal, where at least one of the plurality of lanes is unused. The link is then reconfigured to discontinue routing data on the particular lane and replace the particular lane with the at least one unused lane, where reconfiguring the link includes re-routing data of each lane in a subset of the plurality of lanes to an adjacent lane in the plurality of lanes.

In one example, the particular lane is identified as marginal based on a mapping of a bit error to the particular lane, and the bit error is detected from a syndrome value generated from an error code included in data sent over the link.

In one example, the particular lane is identified as marginal based on a threshold amount of detected bit errors being mapped to the particular lane.

In one example, a plurality of flits of a plurality of different protocols are to be sent using the link.

One or more embodiments may provide a system including an interconnect including a plurality of lanes, where the plurality of lanes include a plurality of dedicated data lanes, at least one dedicated valid signal lane, and at least one stream signal lane, and the stream lane identifies which of a plurality of different protocols is to be sent in a corresponding flit using the data lanes. The system can further include a first device to send data over the data lanes, the data to include a cyclic redundancy check (CRC), and a second device communicatively coupled to the first device using the interconnect, the second device to receive the data and determine an error affecting a specific one of the plurality of data lanes based on the CRC.

In one example, the system further includes a lane error manager to identify that a particular one of the plurality of data lanes is marginal, where at least one of the plurality of data lanes is unused, and reroute the data lanes to discontinue use of the particular lane and replace the particular lane with the at least one unused lane, where rerouting the data lanes includes re-routing data of each lane in a subset of the plurality of data lanes to an adjacent lane in the plurality of lanes.

Reference throughout this specification to “one embodiment” or “an embodiment” means that a particular feature, structure, or characteristic described in connection with the embodiment is included in at least one embodiment of the present invention. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A multi-chip package comprising:

a substrate;

a first die mounted on the substrate, the first die comprising interface circuitry to implement a plurality of layered protocol stacks including a first layered protocol stack and a second layered protocol stack, the interface circuitry comprising:

a modular physical (PHY) layer including an electrical sub-block to be shared by the plurality of layered protocol stacks, the electrical sub-block comprising:

a plurality of transmitters to transmit data to external devices over one or more links, wherein a link comprises an aggregation of multiple data lanes, and a plurality of receivers to receive information from the external devices via corresponding links;

a plurality of protocol-specific logic blocks to communicate data in accordance with a corresponding plurality of data communication protocols, the plurality of protocol-specific logic blocks including a first protocol-specific logic block associated with the first layered protocol stack to communicate first data in accordance with a first data communication protocol and a second protocol-specific logic block associated with the second layered protocol stack to communicate second data in accordance with a second data communication protocol; and a logical PHY layer comprising:

multiplexing circuitry to interconnect the first protocol-specific logic block and the second protocol-specific logic block to selected pairs of transmitters and receivers of the electrical sub-block;

a flit encoder to encode each of the first data and the second data into a first and a second plurality of flits, respectively;

an error encoder to generate a plurality of 16-bit cyclic redundancy check (CRC) values based on bit values of corresponding flits of the first plurality of flits;

wherein one or more transmitters of the selected pairs of transmitters and receivers are to transmit one flit of the first and second plurality of flits with a first CRC value over a corresponding one or more data lanes; and an error decoder to detect bit errors in a received flit based on a second CRC value, the received flit and second CRC value received from one or more receivers of the selected pairs of transmitters and receivers.

2. The multi-chip package of claim 1, wherein the error decoder is to detect 1, 2, 3, or 4 bit errors based on the second CRC value.

3. The multi-chip package of claim 1, wherein the modular PHY is protocol agnostic.

4. The multi-chip package of claim 1, wherein a data lane is implemented with a transmitter differential signal pair and a receiver differential signal pair.

5. The multi-chip package of claim 1, wherein the first die comprises a first one or more processor cores.

6. The multi-chip package of claim 1, wherein the first die comprises a memory controller to couple the multi-chip package to a memory.

7. The multi-chip package of claim 1, wherein a separate CRC value is generated for each flit of the first and second plurality of flits.

8. The multi-chip package of claim 1, wherein the multiplexing circuitry is to interconnect the first protocol-specific logic block to a first link comprising a first aggregation of data lanes.

9. The multi-chip package of claim 8, wherein a first plurality of transmitters corresponding to the first aggregation of data lanes are to transmit the first flit over the first aggregation of data lanes.

10. The multi-chip package of claim 9, wherein the first link is to couple the first die to a second die on a different package.

11. The multi-chip package of claim 10, further comprising lane reconfiguration circuitry to remove a first one or more data lanes from the aggregation of data lanes.

12. The multi-chip package of claim 9, wherein the lane reconfiguration circuitry is to add a second one or more data lanes to the first aggregation of data lanes.

13. A system comprising:

a system memory;

a multi-chip package coupled to the system memory, the multi-chip package comprising:

a substrate;

a first die mounted on the substrate, the first die comprising interface circuitry to implement a plurality of layered protocol stacks including a first layered protocol stack and a second layered protocol stack, the interface circuitry comprising:

a modular physical (PHY) layer including an electrical sub-block to be shared by the plurality of layered protocol stacks, the electrical sub-block comprising:

a plurality of transmitters to transmit data to external devices over one or more links, wherein a link comprises an aggregation of multiple data lanes, and a plurality of receivers to receive information from the external devices via corresponding links;

a plurality of protocol-specific logic blocks to communicate data in accordance with a corresponding plurality of data communication protocols, the plurality of protocol-specific logic blocks including a first protocol-specific logic block associated with the first layered protocol stack to communicate first data in accordance with a first data communication protocol and a second protocol-specific logic block associated with the second layered protocol stack to communicate second data in accordance with a second data communication protocol; and a logical PHY layer comprising:

multiplexing circuitry to interconnect the first protocol-specific logic block and the second protocol-specific logic block to selected pairs of transmitters and receivers of the electrical sub-block;

a flit encoder to encode each of the first data and the second data into a first and a second plurality of flits, respectively;

an error encoder to generate a plurality of 16-bit cyclic redundancy check (CRC) values based on bit values of corresponding flits of the first plurality of flits;

wherein one or more transmitters of the selected pairs of transmitters and receivers are to transmit one flit of the first and second plurality of flits with a first CRC value over a corresponding one or more data lanes; and an error decoder to detect bit errors in a received flit based on a second CRC value, the received flit and second CRC value received from one or more receivers of the selected pairs of transmitters and receivers.

14. The system of claim 13, wherein the error decoder is to detect 1, 2, 3, or 4 bit errors based on the second CRC value.

15. The system of claim 13, wherein the modular PHY is protocol agnostic.

16. The system of claim 13, wherein a data lane is implemented with a transmitter differential signal pair and a receiver differential signal pair.

17. The system of claim 13, wherein the first die comprises a first one or more processor cores.

18. The system of claim 13, wherein the first die comprises a memory controller to couple the multi-chip package to the system memory.

19. The system of claim 13, wherein a separate CRC value is generated for each flit of the first and second plurality of flits.

20. The system of claim 13, wherein the multiplexing circuitry is to interconnect the first protocol-specific logic block to a first link comprising a first aggregation of data lanes.

21. The system of claim 20, wherein a first plurality of transmitters corresponding to the first aggregation of data lanes are to transmit the first flit over the first aggregation of data lanes.

22. The system of claim 21, wherein the first link is to couple the first die to a second die on a different package.

23. The system of claim 22, further comprising lane reconfiguration circuitry to remove a first one or more data lanes from the aggregation of data lanes.

24. The system of claim 21, wherein the lane reconfiguration circuitry is to add a second one or more data lanes to the first aggregation of data lanes.

25. The system of claim 13, further comprising a graphics processor coupled to the multi-chip package to execute graphics processing operations.

26. The system of claim 25, further comprising one or more input/output (IO) devices coupled to the multi-chip package over one or more of the data lanes.

* * * * *